(12) United States Patent
Sasaki

(10) Patent No.: US 6,525,904 B1
(45) Date of Patent: Feb. 25, 2003

(54) THIN FILM MAGNETIC HEAD WITH PRECISELY CONTROLLED POLE WIDTH AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 99 days.

(21) Appl. No.: 09/599,591

(22) Filed: Jun. 22, 2000

(30) Foreign Application Priority Data

Jun. 25, 1999 (JP) .......................... 11-180300

(51) Int. Cl.⁷ .............................. G11B 5/147; G11B 5/39
(52) U.S. Cl. ....................................... 360/126; 360/317
(58) Field of Search ................................ 360/317, 126

(56) References Cited

U.S. PATENT DOCUMENTS

| | | | |
|---|---|---|---|
| 5,438,747 A | 8/1995 | Krounbi et al. | 360/317 |
| 5,600,519 A | 2/1997 | Heim et al. | 360/126 |
| 6,278,580 B1 * | 8/2001 | Sasaki | 360/126 |
| 6,282,776 B1 * | 9/2001 | Otsuka et al. | 29/603.14 |
| 6,304,415 B1 * | 10/2001 | Tateyama et al. | 360/126 |
| 6,317,288 B1 * | 11/2001 | Sasaki | 360/126 |
| 6,320,726 B1 * | 11/2001 | Sasaki | 360/126 |
| 6,327,116 B1 * | 12/2001 | Watanabe et al. | 360/126 |
| 6,330,127 B1 * | 12/2001 | Sasaki | 360/126 |
| 6,337,783 B1 * | 1/2002 | Santini | 360/317 |
| 6,373,657 B1 * | 4/2002 | Kamijima | 360/126 |

FOREIGN PATENT DOCUMENTS

| | | |
|---|---|---|
| JP | A-07-262519 | 10/1995 |
| JP | A-08-249614 | 9/1996 |

* cited by examiner

*Primary Examiner*—Jefferson Evans
(74) *Attorney, Agent, or Firm*—Oliff & Berridge, PLC

(57) ABSTRACT

Provided are a thin film magnetic head and a method of manufacturing the same which can precisely control a pole width and can obtain sufficient overwrite properties even when the pole width is reduced. A top pole comprises a yoke portion, two intermediate portions and an end portion. A step along the width is provided at a coupling portion between the portions. The widths of magnetic layer portions are determined in the following manner: the width of the end portion<the width of one intermediate portion<the width of the other intermediate portion<the width of the yoke portion. The one intermediate portion is coupled to the end portion at a substantially right angle. The position of the coupling portion is matched to the position where a throat height is equal to zero (TH0 position). This allows preventing an increase in a pattern width of a photoresist for forming the end portion. Therefore, a write track width can be reduced. Moreover, a sufficient magnetic flux generated in the yoke portion is focused in stages through the intermediate portions. Thus, it is possible to prevent the magnetic flux from being saturated before reaching the end portion. Therefore, sufficient overwrite properties can be ensured.

13 Claims, 29 Drawing Sheets

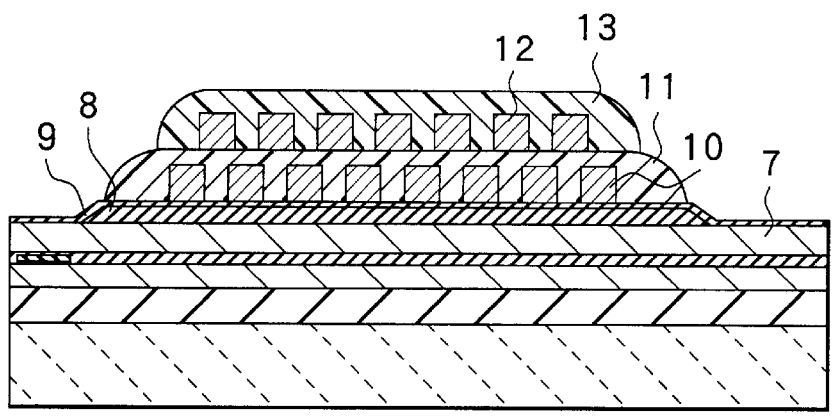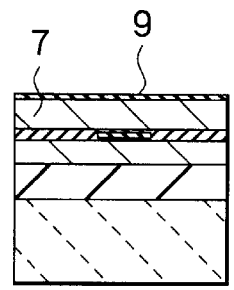
FIG.4A  FIG.4B
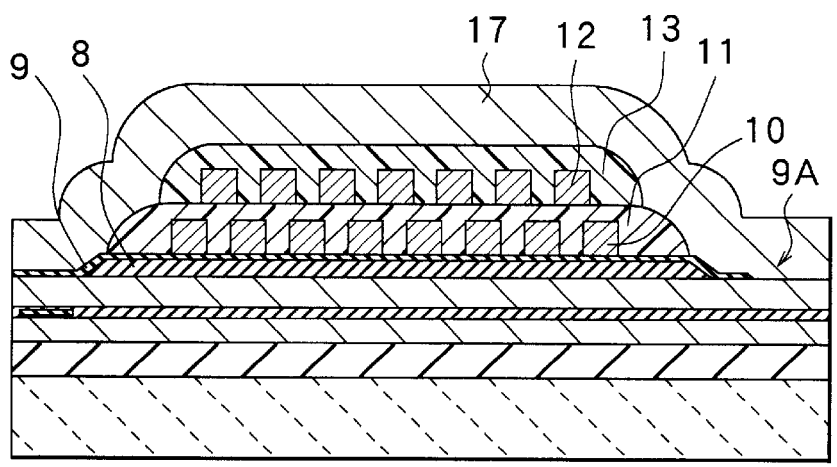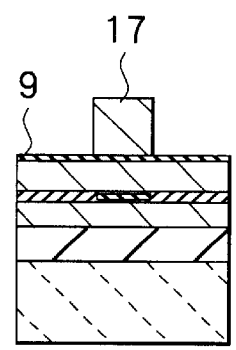
FIG.5A  FIG.5B

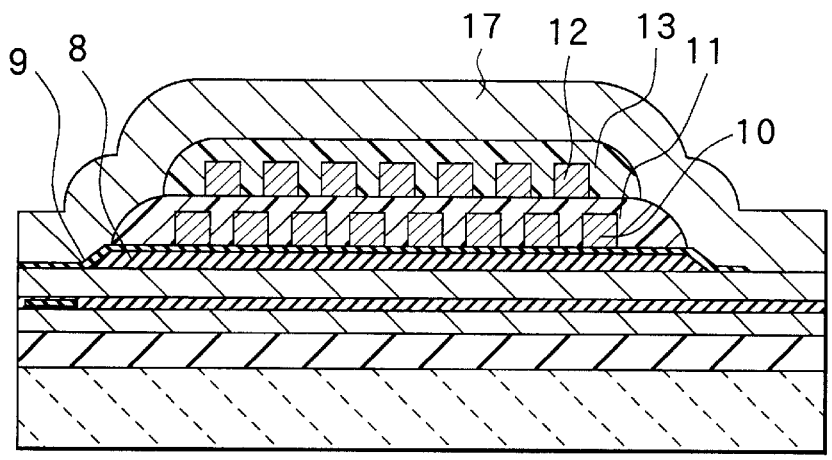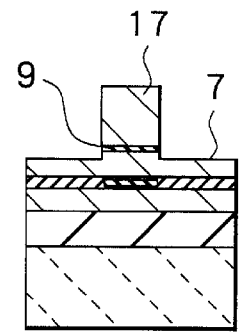
FIG.6A          FIG.6B
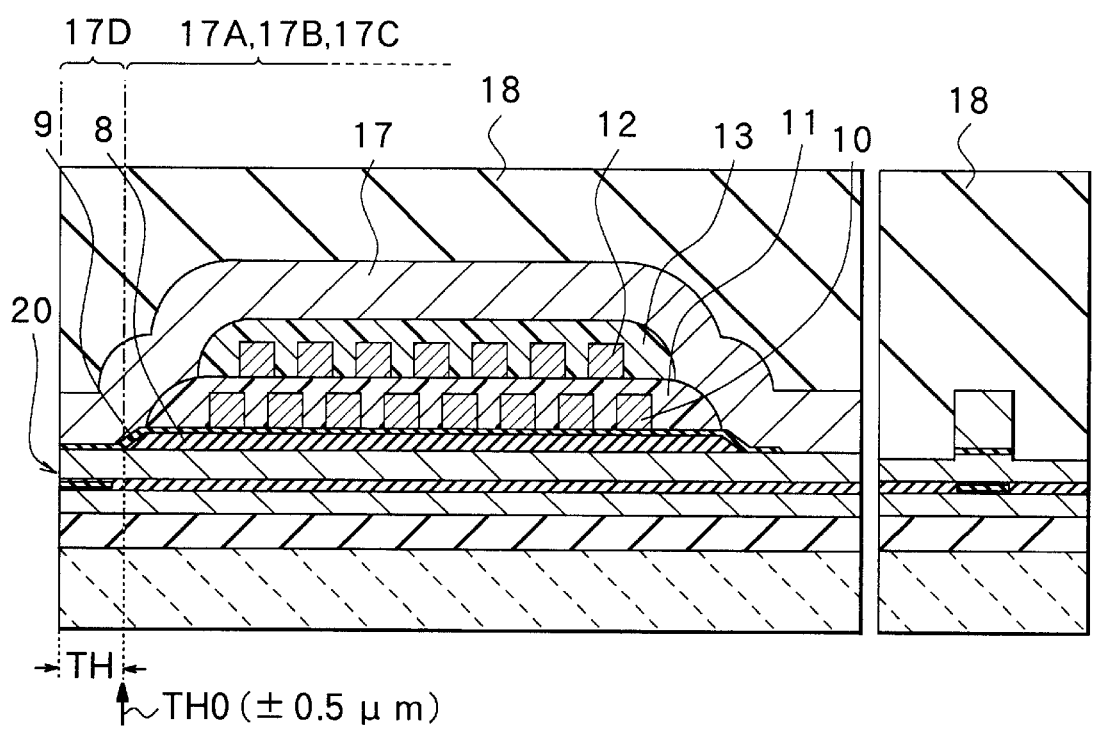
FIG.7A          FIG.7B

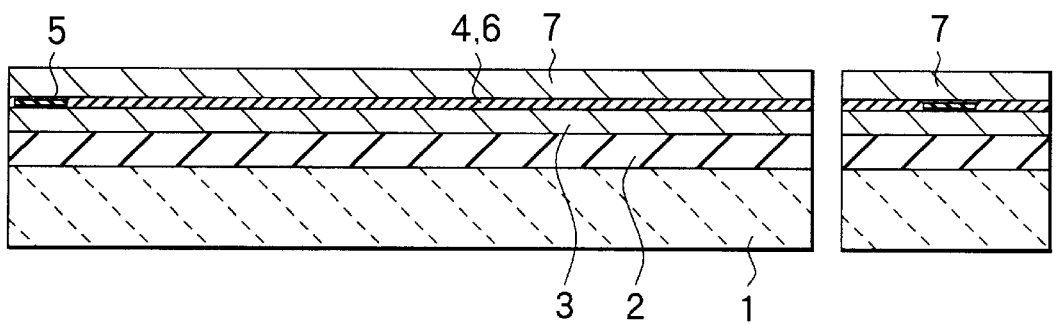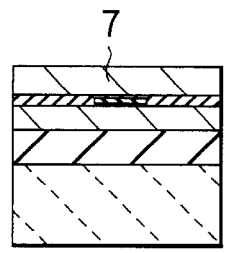
FIG.20A
FIG.20B
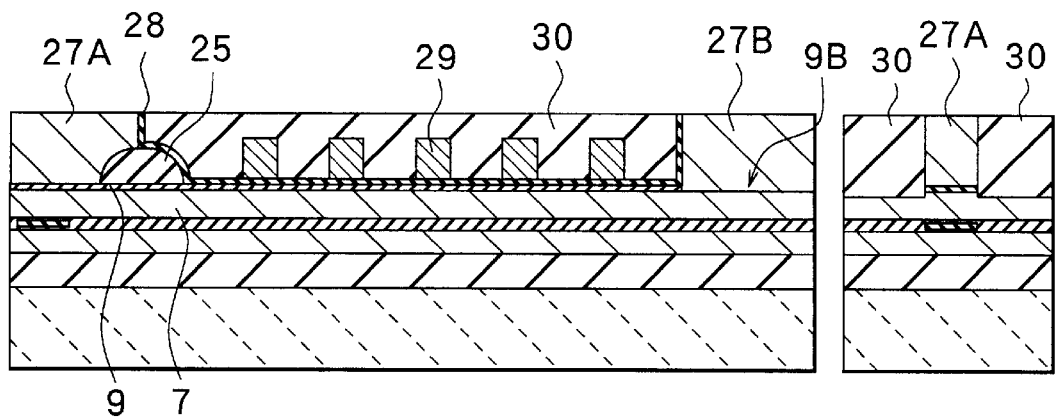
FIG.21A
FIG.21B

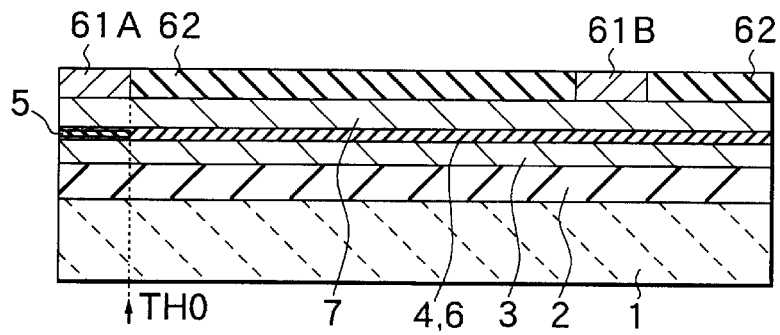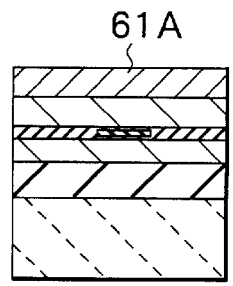
FIG.40A    FIG.40B
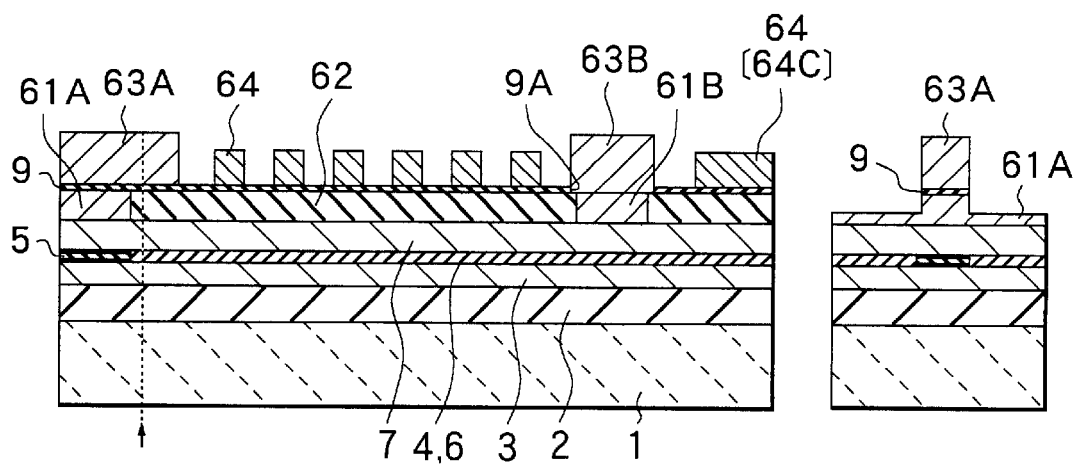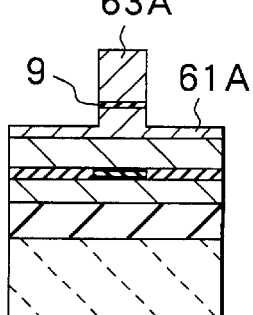
FIG.41A    FIG.41B

THIN FILM MAGNETIC HEAD WITH PRECISELY CONTROLLED POLE WIDTH AND METHOD OF MANUFACTURING SAME

BACKGROUND OF THE INVENTION

1. Field of the Invention

The invention relates to a thin film magnetic head having at least an inductive magnetic transducer for writing and a method of manufacturing the same.

2. Description of the Related Art

Recently, an improvement in performance of a thin film magnetic head has been sought in accordance with an increase in a surface recording density of a hard disk drive. A composite thin film magnetic head, which has a stacked structure comprising a recording head having an inductive magnetic transducer for writing and a reproducing head having a magnetoresistive (hereinafter referred to as MR) element for reading, is widely used as the thin film magnetic head.

Factors that determine the performance of the recording head include a throat height (TH). The throat height refers to a length (height) of a magnetic pole between an air bearing surface and an edge of an insulating layer for electrically isolating thin film coils for generating a magnetic flux. The air bearing surface refers to a surface of the thin film magnetic head facing a magnetic recording medium and is sometimes called a track surface. A reduction in the throat height is desired for the improvement in the performance of the recording head. The throat height is controlled in accordance with an amount of polishing of the air bearing surface.

An increase in a recording density of the performance of the recording head requires the increase in a track density of the magnetic recording medium. For this purpose, it is necessary to realize the recording head having a narrow track structure. In this structure, a bottom pole and a top pole, which are formed on the bottom and top of a write gap sandwiched between the bottom pole and the top pole, have a narrow width of from a few microns to the submicron order on the air bearing surface. Semiconductor processing technology is used in order to achieve this structure.

An example of a method of manufacturing the composite thin film magnetic head will be now described as an example of a conventional method of manufacturing the thin film magnetic head with reference to FIGS. 43 to 48.

In the manufacturing method, first, as shown in FIG. 43, an insulating layer 102 made of, for example, alumina ($Al_2O_3$) is deposited with a thickness of about 5 $\mu$m to 10 $\mu$m on a substrate 101 made of, for example, altic ($Al_2O_3$ and TiC). Then, a bottom shield layer 103 for the reproducing head is formed on the insulating layer 102. Then, for example, alumina is sputter deposited with a thickness of 100 nm to 200 nm on the bottom shield layer 103, whereby a shield gap film 104 is formed. Then, an MR film 105 for constituting the MR element for reproducing is formed with a thickness of a few tens of nanometers on the shield gap film 104, and the MR film 105 is patterned into a desired shape by high-accuracy photolithography. Then, a lead layer (not shown) for functioning as a lead electrode layer electrically connected to the MR film 105 is formed on both sides of the MR film 105. Then, a shield gap film 106 is formed on the lead layer, the shield gap film 104 and the MR film 105, whereby the MR film 105 is buried in the shield gap films 104 and 106. Then, a top shield-cum-bottom pole (hereinafter referred to as a bottom pole) 107 made of a magnetic material for use in both of the reproducing head and the recording head, e.g., permalloy (NiFe) is formed on the shield gap film 106.

Then, as shown in FIG. 44, a write gap layer 108 made of an insulating film, e.g., an alumina film is formed on the bottom pole 107, and a photoresist layer 109 is formed into a predetermined pattern on the write gap layer 108 by high-accuracy photolithography. Then, first-layer thin film coils 110 made of, for example, copper (Cu) for an inductive recording head are formed on the photoresist layer 109 by plating, for example. Then, a photoresist layer 111 is formed into a predetermined pattern by high-accuracy photolithography so as to coat the photoresist layer 109 and the coils 110. Then, heat treatment takes place at a temperature of, for example, 250° C. in order to flatten the coils 110 and provide insulation among the coils 110. Then, second-layer thin film coils 112 made of, for example, copper are formed on the photoresist layer 111 by plating, for example. Then, a photoresist layer 113 is formed into a predetermined pattern on the photoresist layer 111 and the coils 112 by high-accuracy photolithography. Then, heat treatment takes place at a temperature of, for example, 250° C. in order to flatten the coils 112 and provide insulation among the coils 112.

Then, as shown in FIG. 45, the write gap layer 108 is partially etched at the rear of the coils 110 and 112 (on the right side in FIG. 45) in order to form a magnetic path, whereby an opening 108A is formed. Then, a top yoke-cum-top pole (hereinafter referred to as a top pole) 114 made of a magnetic material for the recording head, e.g., permalloy is selectively formed on the write gap layer 108 and the photoresist layers 109, 111 and 113. The top pole 114 is in contact with and magnetically coupled to the bottom pole 107 in the above-mentioned opening 108A. Then, the write gap layer 108 and the bottom pole 107 are etched by about 0.5 $\mu$m by ion milling using the top pole 114 as a mask. Then, an overcoat layer 115 made of, for example, alumina is formed on the top pole 114. Finally, a slider is machined, whereby a track surface (air bearing surface) 120 of the recording head and the reproducing head is formed. As a result, the thin film magnetic head is completed.

FIGS. 46 to 48 show the structure of the completed thin film magnetic head. FIG. 46 shows a cross section of the thin film magnetic head perpendicular to the air bearing surface 120. FIG. 47 shows an enlarged view of a cross section of the magnetic pole parallel to the air bearing surface 120. FIG. 48 shows a plan view. FIGS. 43 to 46 correspond to a cross section viewed from the direction of the arrows along the line A–AA of FIG. 48. The overcoat layer 115 is not shown in FIGS. 46 to 48.

To improve the performance of the thin film magnetic head, it is important to precisely form the throat height TH, an apex angle θ, a pole width P2W and a pole length P2L shown in FIGS. 46 and 47. The apex angle θ refers to an angle between a straight line connecting corners of side surfaces of the photoresist layers 109, 111 and 113 on the side of the track surface and a top surface of the top pole 114. The pole width P2W defines a write track width on the recording medium. The pole length P2L represents the thickness of the magnetic pole. In FIGS. 46 and 48, a 'TH0 position' refers to an edge of the photoresist layer 109 that is the insulating layer for electrically isolating the thin film coils 110 and 112, on the side of the track surface. The TH0 position indicates a reference position 0 of the throat height TH.

As shown in FIG. 47, the structure, in which the respective side walls of parts of the top pole 114, the write gap layer 108 and the bottom pole 107 are vertically formed in self-alignment, is called a trim structure. The trim structure can prevent the increase in an effective track width resulting from a spread of the magnetic flux generated during writing data on a narrow track. As shown in FIG. 47, a lead layer 121 for functioning as the lead electrode layer electrically connected to the MR film 105 is provided on both sides of the MR film 105. The lead layer 121 is not shown in FIGS. 43 to 46.

FIG. 49 shows a plan structure of the top pole 114. As shown in FIG. 49, the top pole 114 has a yoke portion 114A occupying most of the top pole 114, and a pole chip portion 114B having a substantially constant width W1 as the pole width P2W. An outer edge of the yoke portion 114A forms an angle α with the surface parallel to the air bearing surface 120 at a coupling portion (or junction) between the yoke portion 114A and the pole chip portion 114B. The outer edge of the pole chip portion 114B forms an angle β with the surface parallel to the air bearing surface 120 at the above-mentioned coupling portion. In this case, a is, for example, about 45 degrees, and i is 90 degrees. The width of the pole chip portion 114B defines the write track width on the recording medium. The pole chip portion 114B includes a portion F in front of the TH0 position (on the side of the air bearing surface 120) and a portion R at the rear of the TH0 position (on the side of the yoke portion 114A). As can be seen from FIG. 46, the portion F extends on the flat write gap layer 108, and the portion R and the yoke portion 114A extend on a coil portion (hereinafter referred to as an apex portion) which is coated with the photoresist layers 109, 111 and 113 and rises mountainously.

The shape of the top pole is described in Japanese Patent Laid-open No. Hei 8-249614, for example.

The pole width P2W is required to be precisely formed in order to determine the track width of the recording head. More particularly, microfabrication for reducing the pole width P2W of the top pole to 1.0 μm or less in dimension has been recently required in order to enable recording at high surface density, that is, in order to form the recording head having the narrow track structure.

Frame plating is used as a method of forming the top pole, as disclosed in Japanese Patent Laid-open No. Hei 7-262519, for instance. To form the top pole 114 by using frame plating, a thin electrode film made of, for example, permalloy is first formed over the apex portion by sputtering, for example. Then, the electrode film is coated with a photoresist, and the photoresist is patterned by photolithography, whereby a frame for plating is formed. Then, the top pole 114 is formed by means of plating by using the preformed electrode film as a seed layer.

On the other hand, a difference in height between the apex portion and the other portions is 7 μm to 10 μm or more, for example. The apex portion is coated with the photoresist with a thickness of 3 μm to 4 μm. Assuming that the photoresist on the apex portion requires a film thickness of 3 μm or more at the minimum, a photoresist film having a thickness of, for example, 8 μm to 10 μm or more is formed under the apex portion because the photoresist having fluidity collects at the lower place.

In order to form the narrow track as described above, it is necessary to form a frame pattern of about 1.0 μm in width by the photoresist film. That is, a micro pattern of 1.0 μm or less in width must be formed by the photoresist film of 8 μm to 10 μm or more in thickness. However, it is very difficult for a manufacturing process to form such a thick photoresist pattern with a narrow pattern width.

Moreover, during exposure for photolithography, a light for the exposure is reflected by an underlying electrode film serving as the seed layer, and the photoresist is exposed to the reflected light. This causes a deformation or the like in the photoresist pattern, and thus a sharp and precise photoresist pattern cannot be obtained. Consequently, the top pole cannot be formed into a desired shape, e.g., the side wall of the top pole becomes round in shape. More particularly, when an attempt is made to further reduce the pole width P2W to W1A as shown in FIG. 50, it is further difficult to obtain the desired width W1A. This is caused for the following reason. In the portion R of the pole chip portion 114B extending on the apex portion, the returned light reflected by the underlying electrode film includes not only the vertically reflected light but also the light reflected obliquely or transversely from an inclined surface of the apex portion. As a result of these reflected lights having an influence upon the exposure of the photoresist layer, a photoresist pattern width for defining the pole width P2W is larger than an intended value. As a consequence, the shape of the portion R becomes the shape shown by a broken line in FIG. 50. The width of the portion F of the pole chip portion 114B in front of the TH0 position is a very important factor for defining the track width on the recording medium. Thus, when the width of the portion F is larger than the above-mentioned value W1A, an intended minute track width cannot be obtained.

The same problem exists in the magnetic head described in Japanese Patent Laid-open No. Hei 8-249614 mentioned above. In the magnetic head described in this publication, the pole width is gradually changed from the TH0 position toward the yoke portion. Thus, the light reflected obliquely or transversely from the inclined surface of the apex portion has an influence upon the exposure of the photoresist layer. Because of the influence, the width of the portion in front of the TH0 position cannot be precisely controlled.

Moreover, as shown in FIG. 50, the portion R of the pole chip portion 114B between the TH0 position and the portion coupled to the yoke portion 114A has substantially the same width as the width of the portion F in front of the TH0 position, and thus the portion R has a small cross-sectional area. Thus, the magnetic flux from the yoke portion 114A is saturated in the portion R, and therefore the magnetic flux cannot sufficiently reach to the portion F for defining the track width. Thus, the following problem exists. Overwrite properties, i.e., the properties of overwriting data on data already written on the recording medium is as low as about 10 dB to 20 dB, for example. Consequently, sufficient overwrite properties cannot be ensured.

The invention is designed to overcome the foregoing problems. It is an object of the invention to provide a thin film magnetic head and a method of manufacturing the same which can precisely control a pole width and can obtain sufficient overwrite properties even when the pole width is reduced.

SUMMARY OF THE INVENTION

A thin film magnetic head of the invention comprises: at least two magnetic layers magnetically coupled to each other and having a side facing a recording medium, a part of the side including two magnetic poles facing each other with a gap layer in between; and a thin film coil portion located between the at least two magnetic layers with an insulating layer in between, wherein at least one of the two magnetic layers includes a first magnetic layer portion extending from a recording-medium-facing surface facing the recording medium to or to near an edge of the insulating layer on the side of the recording-medium-facing surface and having a constant width for defining a write track width on the recording medium; a second magnetic layer portion magnetically coupled to the first magnetic layer portion at a first coupling portion located at or near the edge of the insulating layer; and a third magnetic layer portion magnetically coupled to the second magnetic layer portion on the opposite side of the first coupling portion between the first and the second magnetic layer portions, a step along the width is formed at the first coupling portion so that the width of the first magnetic layer portion at the first coupling portion between the first magnetic layer portion and the second magnetic layer portion is smaller than the width of the second magnetic layer portion at the first coupling portion, and a step along the width is formed at a second coupling portion so that the width of the second magnetic layer portion at the second coupling portion between the second magnetic layer portion and the third magnetic layer portion is smaller than the width of the third magnetic layer portion at the second coupling portion.

A method of manufacturing a thin film magnetic head of the invention comprises the steps of forming at least two magnetic layers magnetically coupled to each other and having a side facing a recording medium, a part of the side including two magnetic poles facing each other with a gap layer in between; and forming a thin film coil portion located between the at least two magnetic layers with an insulating layer in between, wherein at least one of the two magnetic layers is formed so as to include a first magnetic layer portion extending from a recording-medium-facing surface facing the recording medium to or to near an edge of the insulating layer on the side of the recording-medium-facing surface and having a constant width for defining a write track width on the recording medium; a second magnetic layer portion magnetically coupled to the first magnetic layer portion at a first coupling portion located at or near the edge of the insulating layer; and a third magnetic layer portion magnetically coupled to the second magnetic layer portion on the opposite side of the first coupling portion between the first and the second magnetic layer portions, a step along the width is formed at the first coupling portion so that the width of the first magnetic layer portion at the first coupling portion between the first magnetic layer portion and the second magnetic layer portion is smaller than the width of the second magnetic layer portion at the first coupling portion, and a step along the width is formed at a second coupling portion so that the width of the second magnetic layer portion at the second coupling portion between the second magnetic layer portion and the third magnetic layer portion is smaller than the width of the third magnetic layer portion at the second coupling portion.

In the thin film magnetic head or the method of manufacturing the same of the invention, the write track width on the recording medium is defined by the constant width of the first magnetic layer portion. The first magnetic layer portion is magnetically coupled to the second magnetic layer portion having the larger width than the width of the first magnetic layer portion at or near the edge of the insulating layer on the side of the recording-medium-facing surface. The step along the width is formed at the first coupling portion. The second magnetic layer portion is magnetically coupled to the third magnetic layer portion having the larger width than the width of the second magnetic layer portion on the side of the second magnetic layer portion opposite to the first coupling portion between the first and second magnetic layer portions. The step along the width is formed at the second coupling portion.

In the thin film magnetic head or the method of manufacturing the same of the invention, a step face of the second magnetic layer portion at the first coupling portion may be substantially perpendicular to a direction in which the first magnetic layer portion extends.

In the thin film magnetic head or the method of manufacturing the same of the invention, the edges of the step face of the second magnetic layer portion along the width may be chamfered.

In the thin film magnetic head or the method of manufacturing the same of the invention, the width of the second magnetic layer portion may be substantially fixed regardless of the position thereof.

In the thin film magnetic head or the method of manufacturing the same of the invention, the width of the second magnetic layer portion may vary according to the position thereof.

In the thin film magnetic head or the method of manufacturing the same of the invention, the width of the second magnetic layer portion may become larger as it is farther from the first coupling portion.

In the thin film magnetic head or the method of manufacturing the same of the invention; a step face of the third magnetic layer portion at the second coupling portion may be substantially perpendicular to a direction in which the second magnetic layer portion extends.

In the thin film magnetic head or the method of manufacturing the same of the invention, the width of the third magnetic layer portion may be substantially fixed regardless of the position thereof.

In the thin film magnetic head or the method of manufacturing the same of the invention, the width of the third magnetic layer portion may vary according to the position thereof.

In the thin film magnetic head or the method of manufacturing the same of the invention, the width of the third magnetic layer portion may become larger as it is farther from the second coupling portion.

In the thin film magnetic head or the method of manufacturing the same of the invention, the one magnetic layer may further include a fourth magnetic layer portion magnetically coupled to at least a part of the first magnetic layer portion, the second magnetic layer portion or the third magnetic layer portion and having the larger width and area than the width and area of the third magnetic layer portion.

In the thin film magnetic head or the method of manufacturing the same of the invention, the first magnetic layer portion, the second magnetic layer portion and the third magnetic layer portion may be integrally formed by the same step.

In the thin film magnetic head or the method of manufacturing the same of the invention, the first magnetic layer portion, the second magnetic layer portion, the third magnetic layer portion and the fourth magnetic layer portion may be integrally formed by the same step.

In the thin film magnetic head or the method of manufacturing the same of the invention, the first magnetic layer portion, the second magnetic layer portion and the third magnetic layer portion may be integrally formed by the same step, and the fourth magnetic layer portion may be formed as a separate part by a different step from the step of forming the first magnetic layer portion, the second magnetic layer portion and the third magnetic layer portion.

In the thin film magnetic head or the method of manufacturing the same of the invention, the fourth magnetic layer portion may extend so as to overlap at least a part of the first magnetic layer portion, the second magnetic layer portion or the third magnetic layer portion.

In the thin film magnetic head or the method of manufacturing the same of the invention, the fourth magnetic layer portion may extend so as to overlap a part of the first magnetic layer portion across the first coupling portion between the first and second magnetic layer portions, and an edge face of the fourth magnetic layer portion at the overlapping portion on the side of the recording-medium-facing surface may be perpendicular to the direction in which the first magnetic layer portion extends. In this case, the coupling portion between the first and second magnetic layer portions is recessed relative to the edge face of the fourth magnetic layer portion. Therefore, even if corners of the step along the width at the coupling portion are round in shape, the width of the first magnetic layer portion for defining the write track width on the recording medium is exactly fixed over the whole region between the perpendicular portion and the end portion. Furthermore, the position of the edge face of the fourth magnetic layer portion may match the position of the edge of the insulating layer on the side of the recording-medium-facing surface-facing surface. In this case, the width of the first magnetic layer portion for defining the write track width on the recording medium is exactly fixed over the whole region called a throat height.

In the thin film magnetic head or the method of manufacturing the same of the invention, at least a part of the second magnetic layer portion or the third magnetic layer portion may be located on an inclined surface formed of the insulating layer. In this case, even if exposure for photolithography for forming the first magnetic layer portion is adversely influenced due to the formation of at least a part of the second or third magnetic layer portion on the inclined surface and thus the corners of the step along the width at the first coupling portion are relatively greatly rounded, a variation in the substantial width of the first magnetic layer portion is avoided.

Other and further objects, features and advantages of the invention will appear more fully from the following description.

BRIEF DESCRIPTION OF THE DRAWINGS

FIGS. 4A and 4B are cross sectional views for describing the step following the step of FIGS. 3A and 3B;

FIGS. 5A and 5B are cross sectional views for describing the step following the step of FIGS. 4A and 4B;

FIGS. 6A and 6B are cross sectional views for describing the step following the step of FIGS. 5A and 5B;

FIGS. 7A and 7B are cross sectional views for describing the step following the step of FIGS. 6A and 6B;

FIGS. 20A and 20B are cross sectional views for describing a step of a method of manufacturing a thin film magnetic head according to a second embodiment of the invention;

FIGS. 21A and 21B are cross sectional views for describing the step following the step of FIGS. 20A and 20B;

FIGS. 40A and 40B are cross sectional views for describing a step of a method of manufacturing a thin film magnetic head according to a fourth embodiment of the invention;

FIGS. 41A and 41B are cross sectional views for describing the step following the step of FIGS. 40A and 40B;

DETAILED DESCRIPTION OF THE PREFERRED EMBODIMENTS

Embodiments of the invention will be described in detail below with reference to the accompanying drawings.
[First Embodiment]

Figure 8:
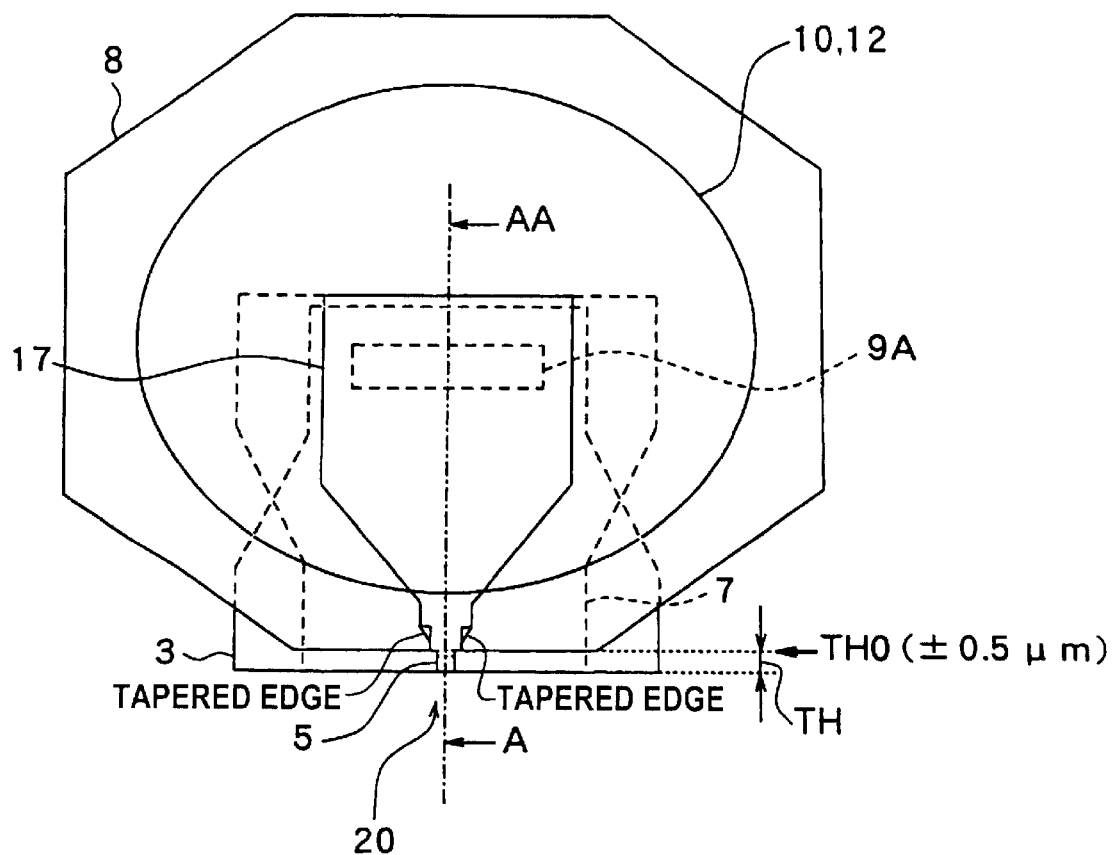
FIG. 8 is a plan view of a plan structure of the completed thin film magnetic head.

First, a method of manufacturing a composite thin film magnetic head will be described as a method of manufacturing a thin film magnetic head according to a first embodiment of the invention with reference to FIGS. 1A and 1B to FIG. 8. Since the thin film magnetic head according to the embodiment is embodied by the method of manufacturing a thin film magnetic head according to the embodiment, the thin film magnetic head will be described below in conjunction with the method of manufacturing a thin film magnetic head. FIGS. 1A, 2A, 3A, 4A, 5A, 6A and 7A show a cross section perpendicular to an air bearing surface. FIGS. 1B, 2B, 3B, 4B, 5B, 6B and 7B show a cross section of a magnetic pole parallel to the air bearing surface. FIG. 8 shows a plan structure of the composite thin film magnetic head.

Figures 1A, 1B:
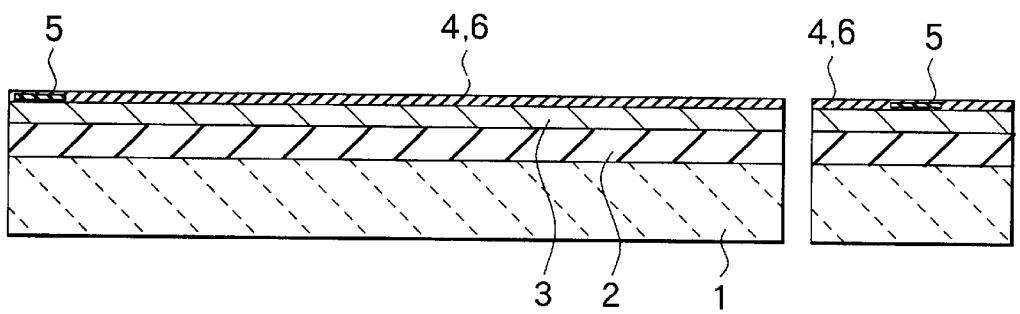
FIGS. 1A and 1B are cross sectional views for describing a step of a method of manufacturing a thin film magnetic head according to a first embodiment of the invention.

In the manufacturing method according to the embodiment, first, as shown in FIGS. 1A and 1B, an insulating layer 2 made of, for example, alumina ($Al_2O_3$) is deposited with a thickness of about 3 $\mu$m to 5 $\mu$m on a substrate 1 made of, for example, altic ($Al_2O_3$ and TiC). Then, permalloy (NiFe) is selectively formed with a thickness of about 3 $\mu$m on the insulating layer 2 by plating using a photoresist film as a mask, whereby a bottom shield layer 3 for a reproducing head is formed.

Then, for example, alumina is sputter deposited with a thickness of 100 nm to 200 nm on the bottom shield layer 3, whereby a shield gap film 4 is formed. Then, an MR film 5 for constituting an MR element for reproducing is formed with a thickness of a few tens of nanometers or less on the shield gap film 4, and the MR film 5 is formed into a desired shape by high-accuracy photolithography. Then, a lead layer (not shown) for functioning as a lead electrode layer electrically connected to the MR film 5 is formed on both sides of the MR film 5. Then, a shield gap film 6 is formed on the lead layer, the shield gap film 4 and the MR film 5, whereby the MR film 5 is buried in the shield gap films 4 and 6.

Figures 2A, 2B:
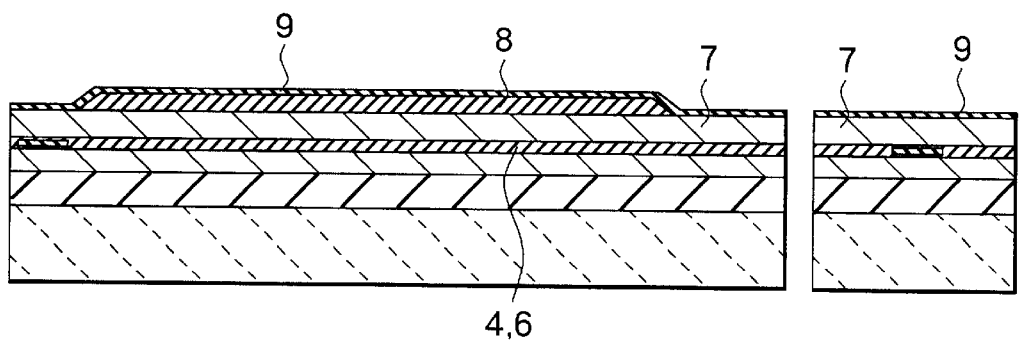
FIGS. 2A and 2B are cross sectional views for describing the step following the step of FIGS. 1A and 1B.

Then, as shown in FIGS. 2A and 2B, a top shield-cum-bottom pole (hereinafter referred to as a bottom pole) 7 made of, for example, permalloy is selectively formed with a thickness of about 3 $\mu$m to 4 $\mu$m on the shield gap film 6. The bottom pole 7 corresponds to one of "at least two magnetic layers" of the invention.

Then, an inorganic insulating film, e.g., a silicon oxide film ($SiO_2$) is formed with a thickness of about 1 $\mu$m to 2 $\mu$m on the bottom pole 7. Then, the film is taper etched and thus selectively patterned, whereby an insulating layer 8 for defining an apex angle and a throat height is formed. The insulating layer 8 is not limited to the silicon oxide film, and an alumina film or any other inorganic insulating film such as a silicon nitride film (SiN) may be used as the insulating layer 8. The above-mentioned film may be formed by sputtering or CVD (Chemical Vapor Deposition). Then, a write gap layer 9 made of an insulating film, e.g., an alumina film is formed on the bottom pole 7 and the insulating layer 8.

Figures 3A, 3B:
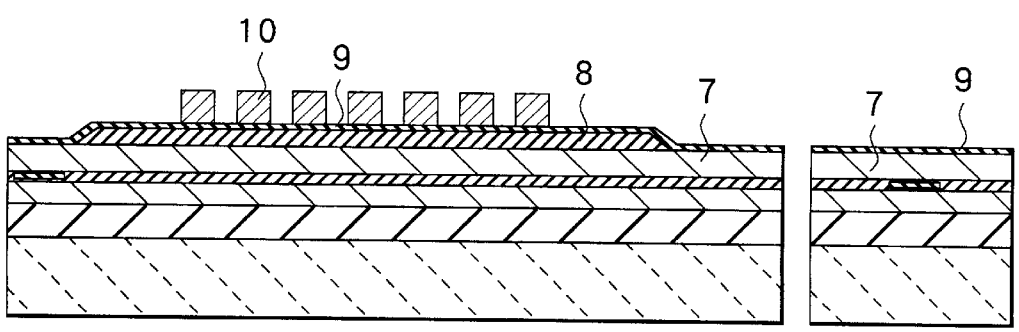
FIGS. 3A and 3B are cross sectional views for describing the step following the step of FIGS. 2A and 2B.

Then, as shown in FIGS. 3A and 3B, first-layer thin film coils 10 made of, for example, copper (Cu) for an inductive recording head are formed with a thickness of 2 $\mu$m to 3 $\mu$m on the write gap layer 9 by electroplating, for example.

Then, as shown in FIGS. 4A and 4B, a photoresist layer 11 is formed into a predetermined pattern on the write gap layer 9 and the coils 10 by high-accuracy photolithography. Then, heat treatment takes place at a temperature of, for example, 250° C. in order to flatten the coils 10 and provide insulation among the coils 10.

Then, second-layer thin film coils 12 made of, for example, copper are formed with a thickness of 2 $\mu$m to 3 $\mu$m on the photoresist layer 11 by electroplating, for example. Then, a photoresist layer 13 is formed into a predetermined pattern on the photoresist layer 11 and the coils 12 by high-accuracy photolithography. Then, heat treatment takes place at a temperature of, for example, 250° C. in order to flatten the coils 12 and provide insulation among the coils 12.

Then, as shown in FIGS. 5A and 5B, the write gap layer 9 is partially etched at the rear of the coils 10 and 12 (on the right side in FIG. 5A) in order to form a magnetic path, whereby an opening 9A is formed. Then, before formation of a top pole, a NiFe alloy, a material having high saturation magnetic flux density is formed with a thickness of about 70 nm by, for instance, sputtering, whereby an electrode film (not shown) to be used as a seed layer for electroplating is formed. Then, the above-mentioned electrode film is coated with a photoresist, and the photoresist is patterned by photolithography, whereby a photoresist pattern (not shown) to be used as a frame for forming the top pole by frame plating is formed. Then, a top yoke-cum-top pole (hereinafter referred to as a top pole) 17 is formed with a thickness of about 3 $\mu$m to 5 $\mu$m by means of electroplating by using the photoresist pattern as the mask and using the preformed electrode film as the seed layer. Then, the photoresist pattern is removed. The top pole 17 has a plan shape shown in FIG. 9, for example. The top pole 17 is in contact with and magnetically coupled to the bottom pole 7 in the above-mentioned opening 9A. For example, a high-saturation magnetic material such as permalloy (NiFe) or iron nitride (FeN) is used as the top pole 17. The shape of the top pole 17 will be described later. The top pole 17 corresponds to "at least one of two magnetic layers" of the invention.

Then, as shown in FIGS. 6A and 6B, the write gap layer 9 and the bottom pole 7 are etched by about 0.5 μm by means of, for example, ion milling using the top pole 17 as the mask, whereby a trim structure is formed.

Then, as shown in FIGS. 7A and 7B, an overcoat layer 18 made of, for example, alumina is formed so as to coat the overall surface. Finally, a slider is machined, whereby the air bearing surface (track surface) of the recording head and the reproducing head is formed. As a result, the thin film magnetic head is completed.

FIG. 8 is a plan view of the thin film magnetic head manufactured by the manufacturing method according to the embodiment. The overcoat layer 18 is not shown in FIG. 8. As shown in FIG. 8, a throat height TH refers to a length between an edge (a TH0 position) of the insulating layer 8 on the side of the magnetic pole and an air bearing surface 20. FIGS. 1A and 1B to FIGS. 7A and 7B correspond to a cross section viewed from the direction of the arrow s along the line A–AA of FIG. 8.

Figure 9:
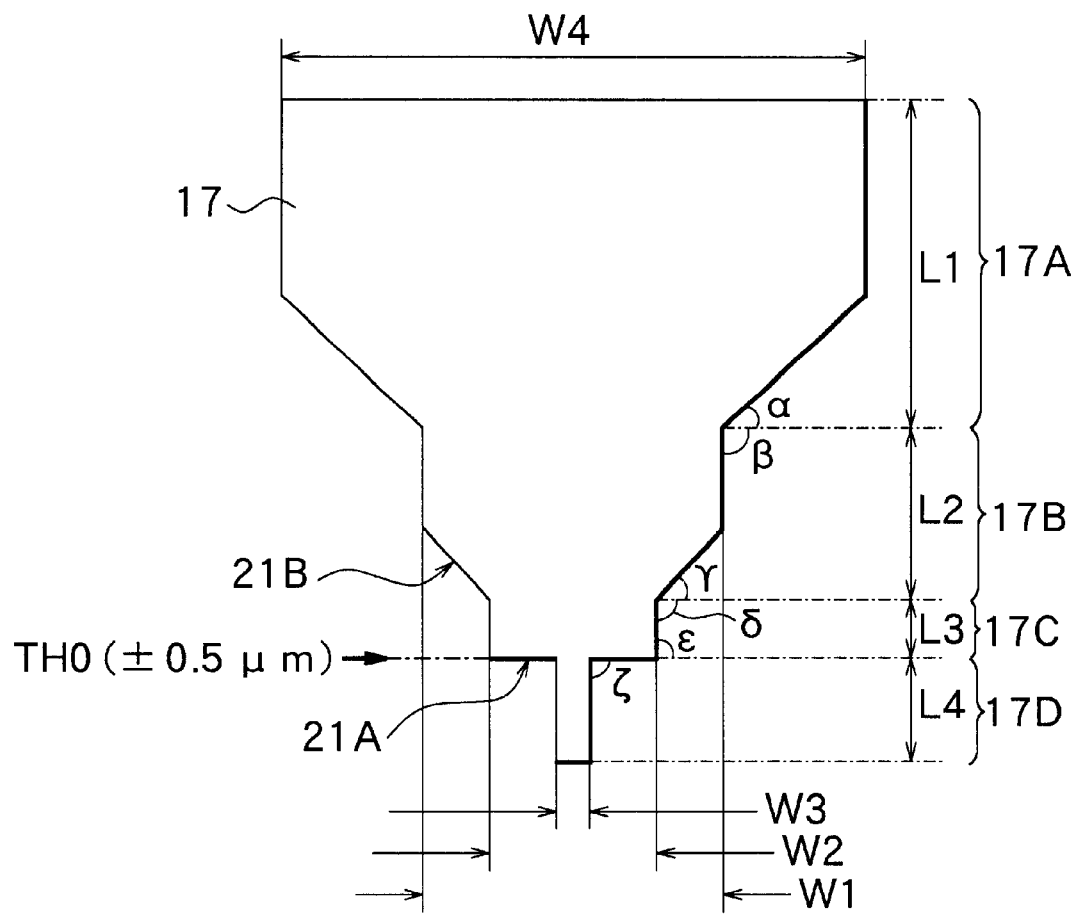
FIG. 9 is a plan view of the plan structure of a top pole of the thin film magnetic head shown in FIG. 8.

FIG. 9 shows the plan structure of the top pole 17. As shown in FIG. 9, the top pole 17 has a yoke portion 17A having a width W4 and occupying most of the top pole 17, an intermediate portion 17B having a substantially constant width W1, an intermediate portion 17C having a substantially constant width W2 smaller than the width W1, and an end portion 17D having a substantially constant width W3 smaller than the width W2. The centers of the yoke portion 17A, the intermediate portion 17B, the intermediate portion 17C and the end portion 17D along the width match one another. An outer edge of the yoke portion 17A forms an angle α with the surface parallel to the air bearing surface 20 at a coupling portion between the yoke portion 17A and the intermediate portion 17B. A side edge face of the intermediate portion 17B forms an angle β with the surface parallel to the air bearing surface 20 at the above-mentioned coupling portion. In the embodiment, for example, α is about 45 degrees and β is about 90 degrees. The outer edge of the intermediate portion 17B forms an angle γ with the surface parallel to the air bearing surface 20 at the coupling portion between the intermediate portion 17B and the intermediate portion 17C. The side edge face of the intermediate portion 17C forms an angle δ with the surface parallel to the air bearing surface 20 at the above-mentioned coupling portion. The width of the intermediate portion 17C is substantially fixed regardless of the position thereof. The width of the end portion 17D is also substantially fixed regardless of the position thereof In the embodiment, for example, γ is about 45 degrees and δ is about 90 degrees.

The coupling portion between the intermediate portion 17C and the end portion 17D of the top pole 17 is located at the TH0 position or near the TH0 position. The position "near the TH0 position" means that the position is within a range of, for example, plus or minus 0.5 μm with respect to the TH0 position. The width of the intermediate portion 17C is W2 at the above-mentioned coupling portion, while the width of the end portion 17D is W3 smaller than W2 at the above-mentioned coupling portion. That is, there is a step along the width between the intermediate portion 17C and the end portion 17D at the TH0 position or near the TH0 position. An end surface (hereinafter referred to as a step face) 21A of the step on the side of the intermediate portion 17C forms an angle ∈ with the side edge face of the intermediate portion 17C. The step face 21A forms an angle ζ with the direction of the side edge face of the end portion 17D (i.e., the direction in which the end portion 17D extends). In the embodiment, both of the angles ∈ and ζ are about 90 degrees. In other words, the step face 21A between the end portion 17D and the intermediate portion 17C is substantially perpendicular to the side edge face of the end portion 17D. "Being substantially perpendicular" means that the angle ζ between a main part of the side edge face of the end portion 17D and a main part of the step face 21A is about 90 degrees and also means that a corner at which the side edge face of the end portion 17D crosses the step face 21A has not only a sharp edge but also a round shape. Preferably, the angle ζ is within a range of from 75 degrees to 120 degrees, for example. The round shape of the above-mentioned corner can be formed even if a portion of the mask for forming the photoresist pattern corresponding to the above-mentioned corner has the sharp edge. Even if the angle of the portion of the mask for forming the photoresist pattern corresponding to the above-mentioned corner is exactly 90 degrees, the angle ζ of the top pole 17 formed by photolithography may increase to 110 degrees to 120 degrees when the amount of light exposure for photolithography is increased. The end portion 17D of the top pole 17 corresponds to "a first magnetic layer portion" of the invention. The intermediate portion 17C corresponds to "a second magnetic layer portion" of the invention. The intermediate portion 17B corresponds to "a third magnetic layer portion" of the invention. The yoke portion 17A corresponds to "a fourth magnetic layer portion" of the invention.

As can be seen from FIG. 7A, the end portion 17D extends on the flat write gap layer 9, and the intermediate portion 17C, the intermediate portion 17B and the yoke portion 17A extend on an apex portion which comprises the photoresist layers 11 and 13 or the like and rises like a hill. The width W3 of the end portion 17D corresponds to a pole width P2W and defines a track width on a recording medium.

Preferably, the dimensions of the portions shown in FIG. 9 have the following values, for example.

A length L1 of the yoke portion 17A is equal to 10.0 μm to 40.0 μm.

A length L2 of the intermediate portion 17B is equal to 2.0 μm to 5.0 μm.

A length L3 of the intermediate portion 17C is equal to 1.0 μm to 3.0 μm.

A length L4 (=the throat height TH) of the end portion 17D is equal to 0.5 μm to 1.0 μm.

The width W4 of the yoke portion 17A is equal to 20.0 μm to 40.0 μm.

The width W1 of the intermediate portion 17B is equal to 3.0 μm to 10.0 μm.

The width W2 of the intermediate portion 17C is equal to 1.0 μm to 3.0 μm.

The width W3 of the end portion 17D is equal to 40.0 μm.

Preferably, the width W3 of the end portion 17D, the width W2 of the intermediate portion 17C and the width W1 of the intermediate portion 17B are set in the following manner: the width W2 of the intermediate portion 17C is larger than the width W3 of the end portion 17D and the width W1 of the intermediate portion 17B is larger than the width W2 of the intermediate portion 17C, whereby W3<W2<W1 holds as the correlation of the widths W1 and W2 relative to the width W3 of the end portion 17D so that the shapes of the magnetic flux portions are determined in accordance with the above-mentioned example of the dimensions of the portions.

Figure 49:
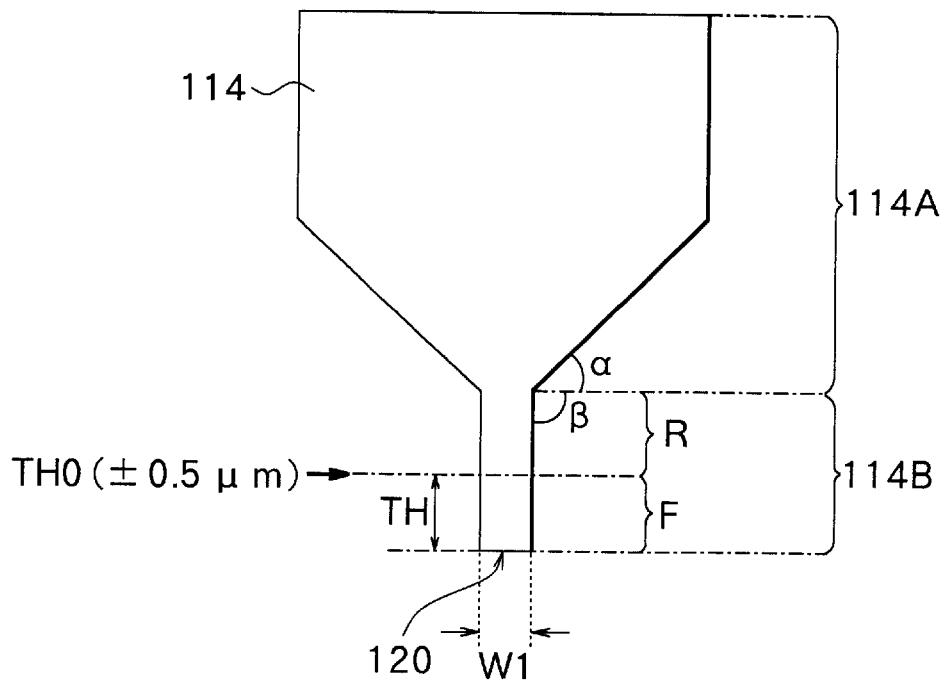
FIG. 49 is a plan view of the structure of the top pole of the conventional thin film magnetic head.
Figure 50:
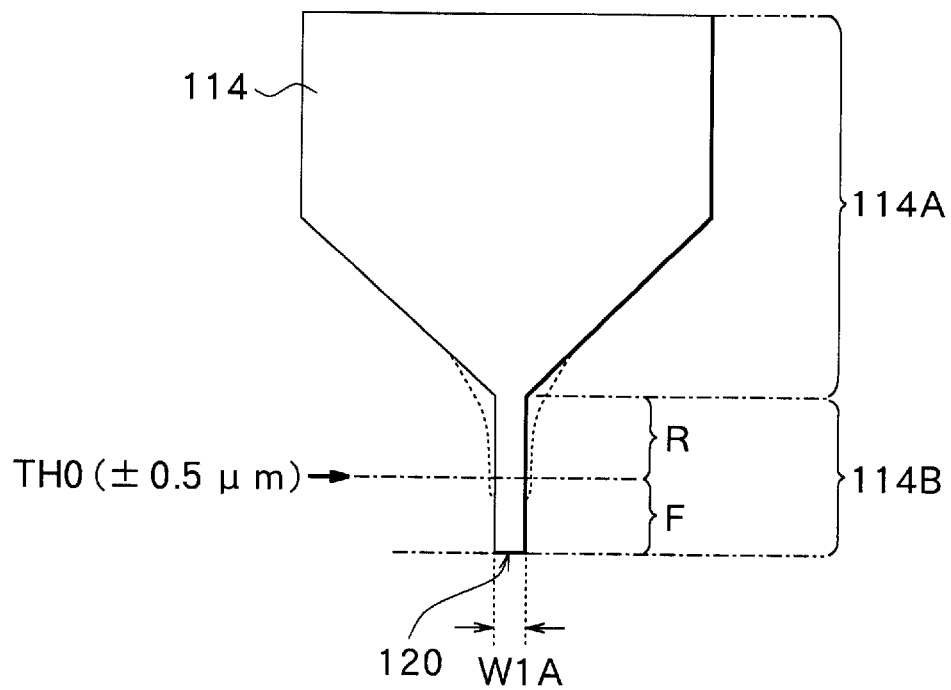
FIG. 50 is a plan view of the top pole for describing a problem resulting from a size reduction of the top pole of the conventional thin film magnetic head.

The thin film magnetic head having the top pole 17 having the above-mentioned shape delivers high performance in overwrite properties. That is, as shown in FIG. 9, in the top pole 17, the intermediate portion 17C coupled to the end portion 17D at the TH0 position has the width W2 that is still larger than the width W3 of the end portion 17D for defining the track width on the recording medium. A volume of the intermediate portion 17c is larger than the volume of a portion R of the related art (see FIG. 49). Furthermore, the invention is provided with the intermediate portion 17B coupled to the intermediate portion 17C and having the larger width W1 than the width W2 of the intermediate portion 17C. The volume of the intermediate portion 17B is larger than the volume of the portion R of the related art (see FIG. 49) and the volume of the intermediate portion 17C. Thus, a magnetic flux generated in the yoke portion 17A by the thin film coils 10 and 12 is not saturated in the intermediate portions 17B and 17C but is focused in stages and sufficiently reaches to the end portion 17D. Therefore, even if the end portion 17D corresponds to a narrow track width of, for example, the submicron order, an enough magnetic flux for overwrite is obtained. In other words, sufficient overwrite properties can be ensured while the track width is reduced.

Figure 12:
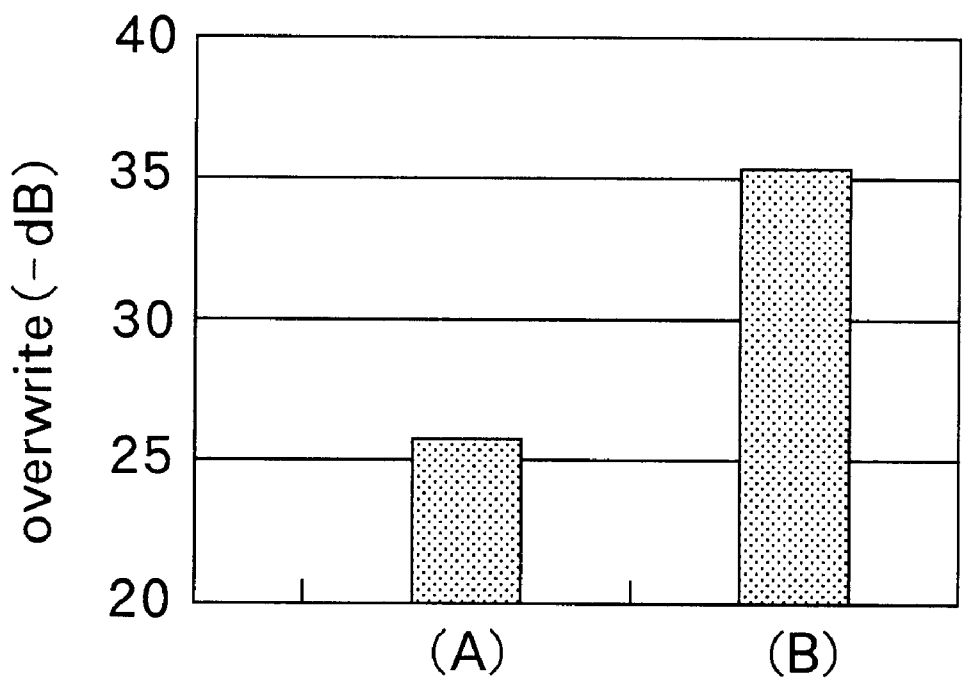
FIG. 12 is a graph of overwrite properties of the thin film magnetic head shown in FIG. 8 and overwrite properties of a conventional thin film magnetic head.

FIG. 12 shows the comparison between the overwrite properties of a conventional thin film magnetic head and the overwrite properties of the thin film magnetic head of the embodiment. A bar (A) in FIG. 12 shows the overwrite properties of the conventional thin film magnetic head having a top pole 114 having the shape shown in FIG. 49A bar (B) in FIG. 12 shows the overwrite properties of the thin film magnetic head of the embodiment having the top pole 17 having the shape shown in FIG. 9. As shown in FIG. 12, the conventional thin film magnetic head has the overwrite properties of 26.0 dB, while the thin film magnetic head of the embodiment has the overwrite properties that is as high as 35.5 dB. That is, the overwrite properties is improved.

Figure 10:
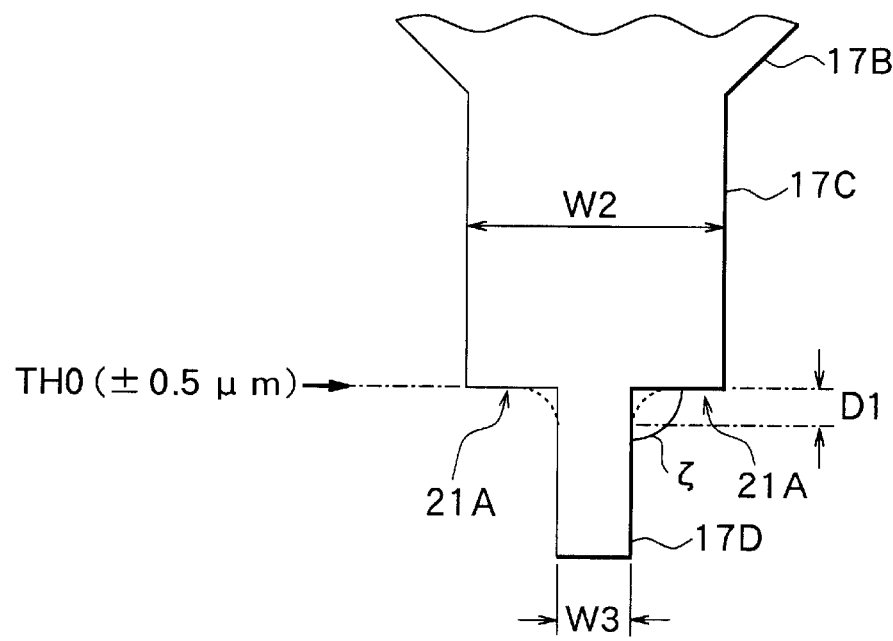
FIG. 10 is an enlarged plan view of the top pole for describing a function of the thin film magnetic head shown in FIG. 8.

Moreover, the thin film magnetic head having the top pole 17 having the above-described shape has the following advantage in a manufacturing process. That is, as shown in FIG. 10, in the top pole 17 of the thin film magnetic head of the embodiment, the angle $\zeta$ between the step face 21A located between the end portion 17D and the intermediate portion 17C and the side edge face of the end portion 17D is about 90 degrees substantially at the TH0 position. Thus, most of light, which is reflected obliquely and transversely from the apex portion at the time of selective exposure and patterning of the photoresist by photolithography using the mask, is shielded by the corner having an angle of about 90 degrees between the step face 21A and the side edge face of the end portion 17D at or near the TH0 position. Therefore, little reflected light reaches to a photoresist region for forming the end portion 17D. Accordingly, it is possible to prevent an increase in a pattern width of the photoresist region for forming the end portion 17D. Specifically, as shown in FIG. 10, it is possible to greatly reduce the length of the end portion 17D, particularly, a length D1 of a portion (shown by a broken line in FIG. 10) that is wider than the intended width W3 of the end portion 17D.

Figure 11:
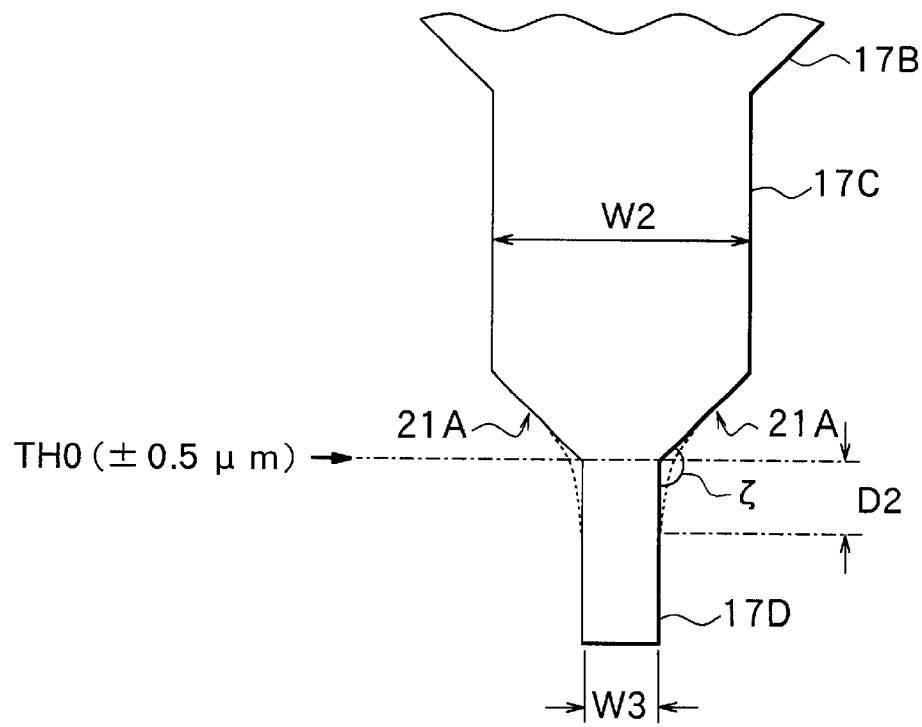
FIG. 11 is an enlarged plan view of the top pole for describing a function of an example to be compared to the thin film magnetic head shown in FIG. 8.

On the other hand, for example, when the angle $\zeta$ between the step face 21A and the side edge face of the end portion 17D is still larger than 90 degrees (e.g., 130 degrees or more) at the TH0 position as shown in FIG. 11, the above-mentioned effect of shielding the reflected light by the corner decreases. Consequently, a length d2 of a portion (shown by a broken line in FIG. 11) that is wider than the intended width W3 of the end portion 17D becomes larger.

As described above, according to the thin film magnetic head of the embodiment, it is possible to prevent the increase in the pattern width of the photoresist region for forming the end portion 17D of the top pole 17. Therefore, the end portion 17D for defining the write track width on the recording medium can substantially have the intended width W3. As a result, the write track width can be reduced.

As described above, according to the thin film magnetic head of the embodiment, the along-the-width step whose angle substantially perpendicularly changes is provided at or near the TH0 position between the end portion 17D and the intermediate portion 17C of the top pole 17. Also, the width of the intermediate portion 17C is sufficiently larger than the width of the end portion 17D for defining the track width. Therefore, it is possible to prevent the increase in the pattern width of the photoresist for forming the end portion 17D. As a result, the write track width can be reduced.

Moreover, an intermediate region between the yoke portion 17A and the end portion 17D has two stages (the intermediate portion 17B and the intermediate portion 17C) as shown in FIG. 9. Therefore, the magnetic flux generated in the yoke portion 17A is prevented from being saturated before reaching to the end portion 17D. Thus, the magnetic flux is focused in stages and is propagated to the end portion 17D. Accordingly, sufficient overwrite properties can be ensured.

Moreover, in the embodiment, the insulating layer 8 for defining the throat height TH is made of the inorganic insulating film. Thus, heat treatment at a temperature of about 250° C. for forming the coils 10 and 12 does not cause a shift (pattern shift) of the edge of the insulating layer 8 and a profile deterioration. Therefore, the throat height can be precisely controlled. Furthermore, an MR height can be precisely controlled, and an apex angle $\theta$ can be precisely controlled.

Moreover, in the embodiment, the insulating layer 8 for defining the throat height TH is made of the inorganic insulating film. Thus, the insulating layer 8 is not shifted when the write gap layer 9 and the bottom pole 7 are etched in order to form the trim structure. This enables the throat height to be precisely controlled.

Moreover, according to the embodiment, the thick insulating layer 8, as well as the thin write gap layer 9, is formed between the bottom pole (top shield) 7 and the thin film coils 10 and 12. Therefore, a high withstand voltage can be obtained between the bottom pole (top shield) 7 and the thin film coils 10 and 12, and a leakage of the magnetic flux from the thin film coils 10 and 12 can be reduced.

In the embodiment, for example, NiFe or iron nitride (FeN) is used as the top pole 17. However, besides these materials, a material having high saturation magnetic flux density, such as an amorphous material of Fe—Co—Zr, may be used as the top pole 17, or a stack of two or more of these materials may be used as the top pole 17. A magnetic material comprising the stack of NiFe and the above-mentioned material having high saturation magnetic flux density may be used as the bottom pole 7.

The shape of the top pole 17 is not limited to the shape shown in FIG. 9. But may be any one of the shapes shown in FIGS. 13 to 19, for example.

Figure 13:
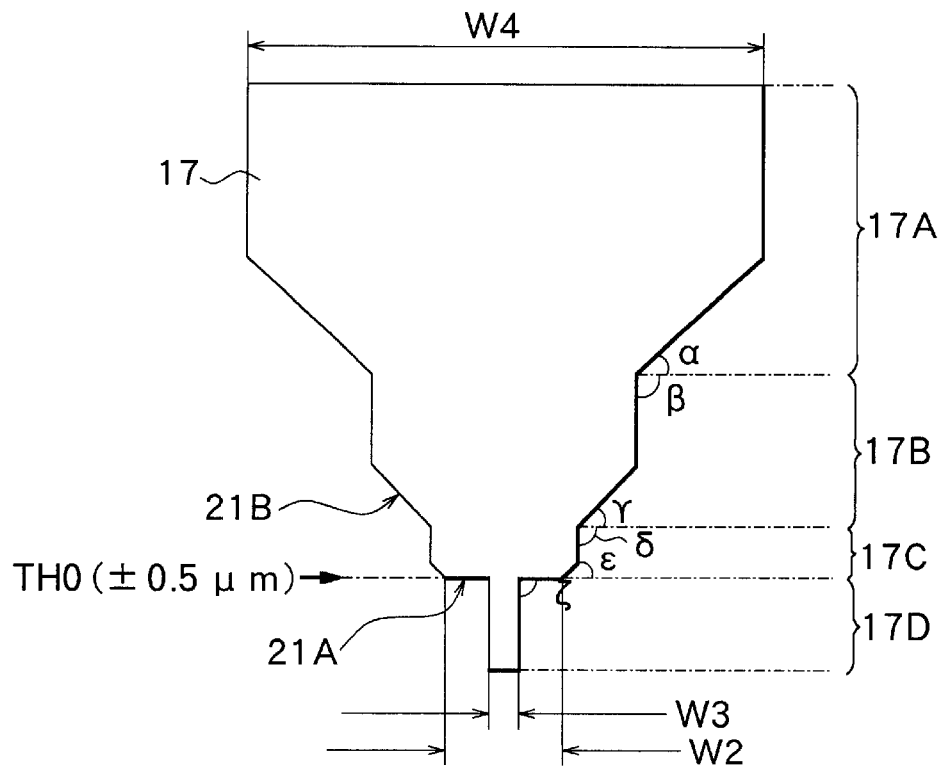
FIG. 13 is a plan view of a modification of the top pole of the thin film magnetic head according to the first embodiment of the invention.

FIG. 13 is a plan view of the top pole 17 in which both of outer corners of the step face 21A of the intermediate portion 17C at the TH0 position are slightly chamfered. The structure of any portion other than the chamfered portion is the same as the structure shown in FIG. 9. In this case, the width of the chamfered step face 21A is equal to W2.

Figure 14:
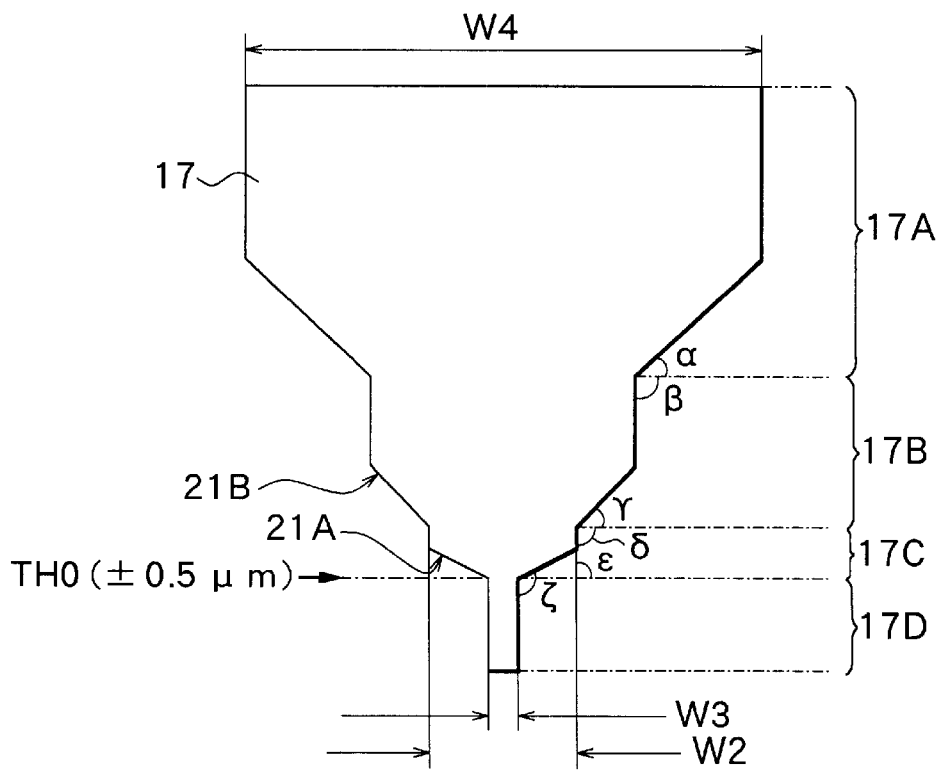
FIG. 14 is a plan view of another modification of the top pole of the thin film magnetic head according to the first embodiment of the invention.

FIG. 14 is a plan view of the top pole 17 in which the angle ζ between the step face 21A and the side edge face of the end portion 17D is larger than 90 degrees at the TH0 position. The angle ζ is, for example, 90 degrees to 150 degrees, or more preferably the angle ζ is within a range of from 90 degrees to 120 degrees.

Figure 15:
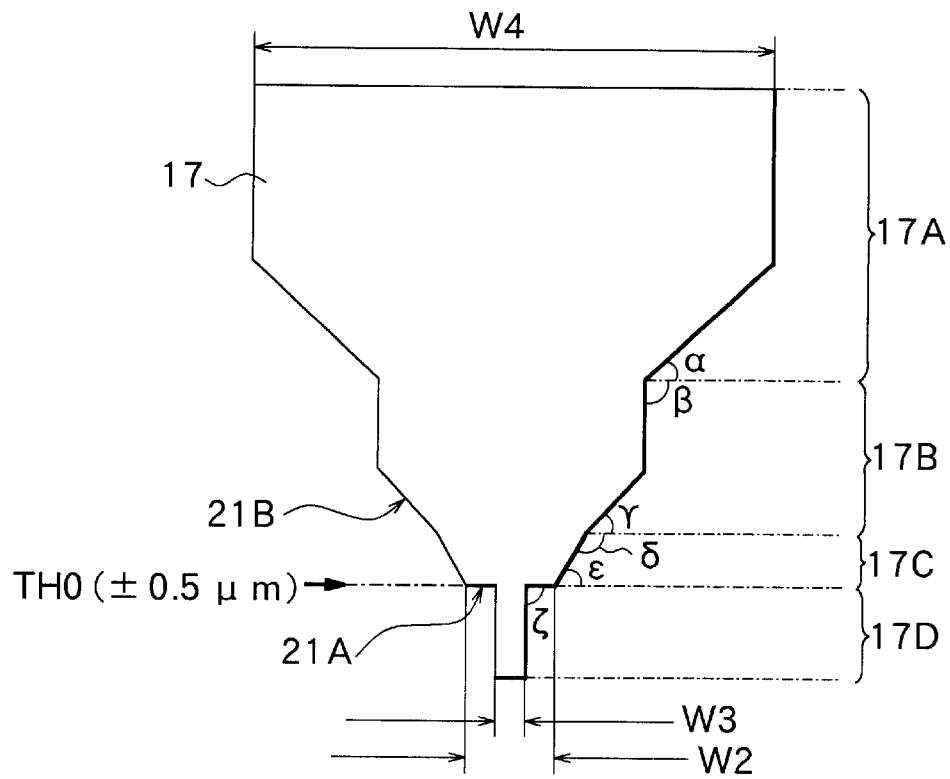
FIG. 15 is a plan view of still another modification of the top pole of the thin film magnetic head according to the first embodiment of the invention.

FIG. 15 is a plan view of the top pole 17 in which the angle ∈ between the side edge face of the intermediate portion 17C and the surface parallel to the air bearing surface 20 is smaller than 90 degrees. Preferably, the angle ∈ is within a range of, for example, from 70 degrees to 80 degrees.

Figure 16:
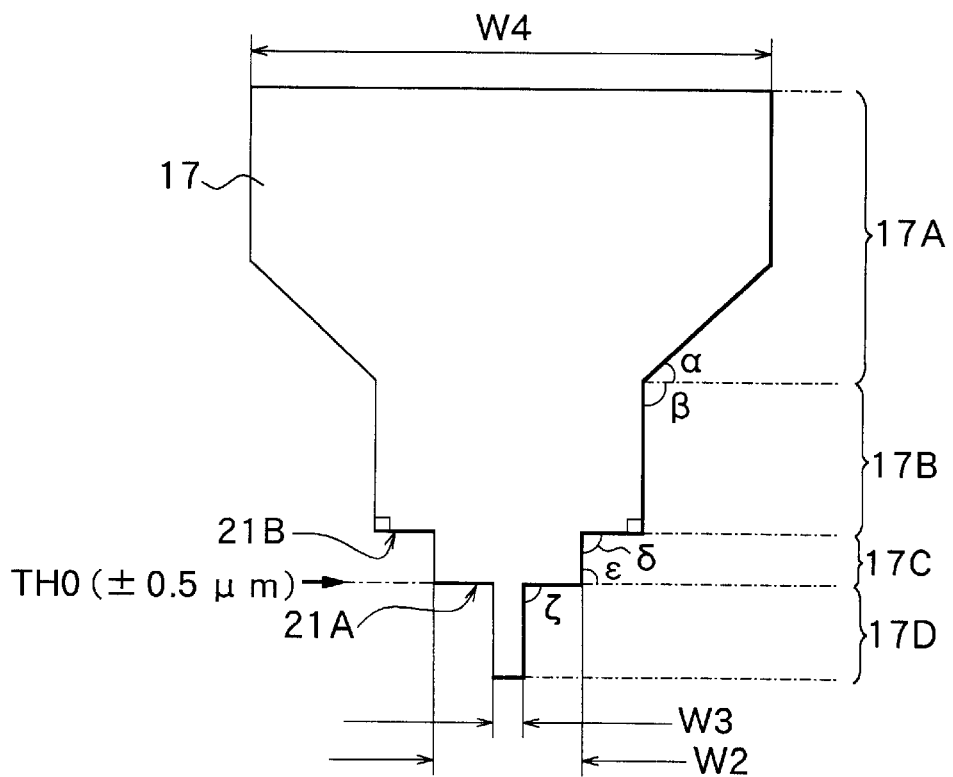
FIG. 16 is a plan view of a further modification of the top pole of the thin film magnetic head according to the first embodiment of the invention.

FIG. 16 is a plan view of the top pole 17 in which the shape of the coupling portion between the end portion 17D and the intermediate portion 17C is the same as the shape shown in FIG. 9 and both of outer angles of the step of the intermediate portion 17B are 90 degrees (i.e., γ is equal to 0 degree).

Figure 17:
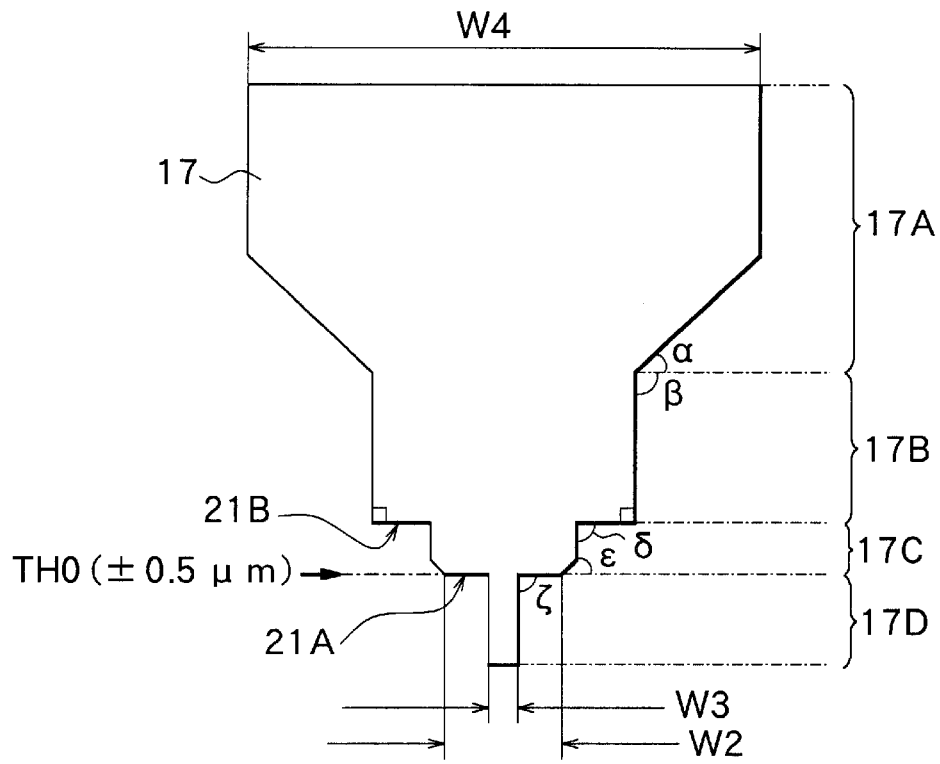
FIG. 17 is a plan view of a further modification of the top pole of the thin film magnetic head according to the first embodiment of the invention.

FIG. 17 is a plan view of the top pole 17 in which the shape of the coupling portion between the end portion 17D and the intermediate portion 17C is the same as the shape shown in FIG. 13 and both of outer angles of the step of the intermediate portion 17B are 90 degrees (i.e., γ is equal to 0 degree).

Figure 18:
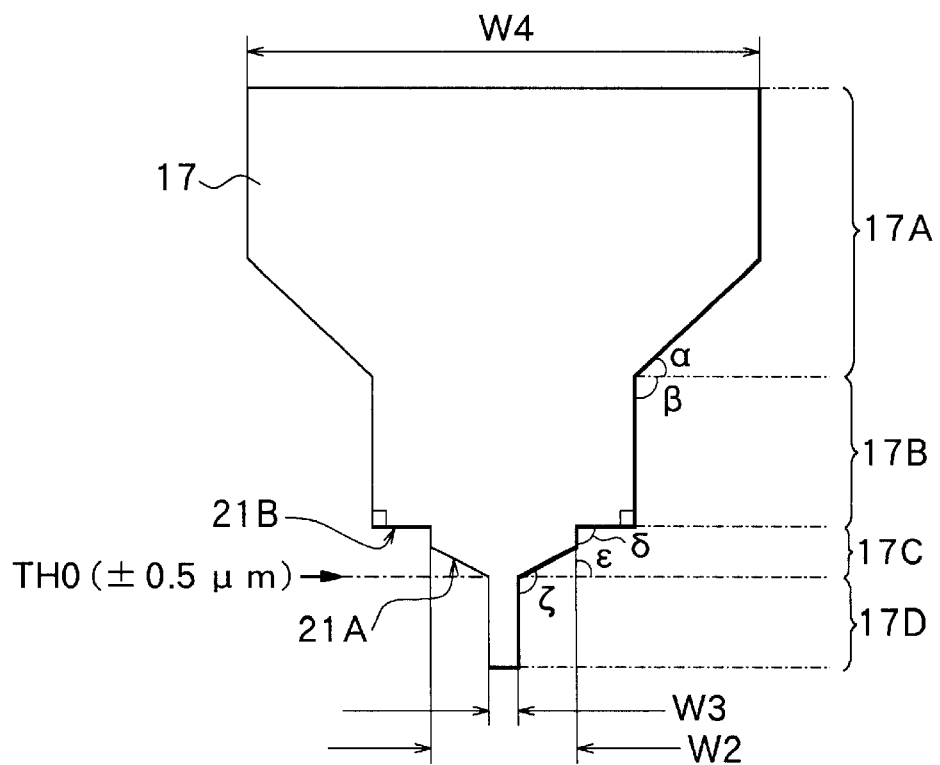
FIG. 18 is a plan view of a further modification of the top pole of the thin film magnetic head according to the first embodiment of the invention.

FIG. 18 is a plan view of the top pole 17 in which the shape of the coupling portion between the end portion 17D and the intermediate portion 17C is the same as the shape shown in FIG. 14 and both of outer angles of the step of the intermediate portion 17B are 90 degrees (i.e., γ is equal to 0 degree).

Figure 19:
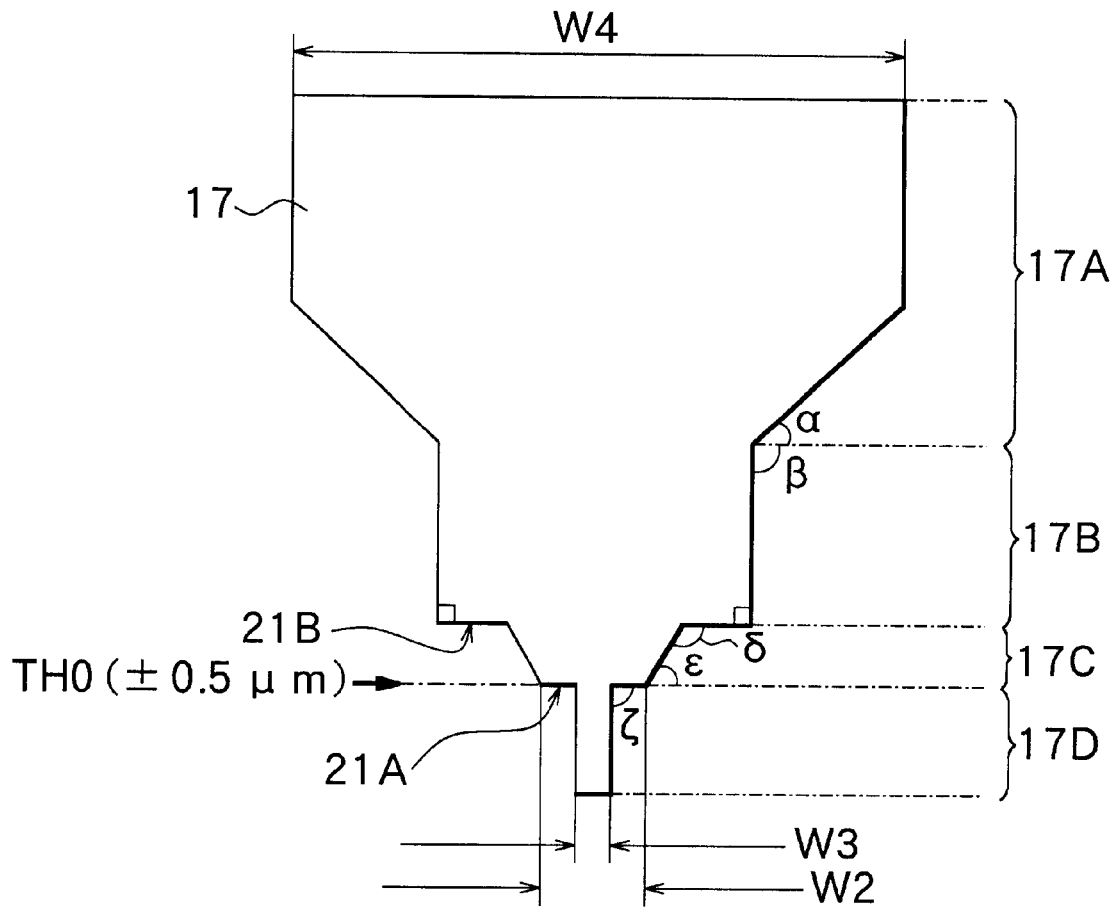
FIG. 19 is a plan view of a further modification of the top pole of the thin film magnetic head according to the first embodiment of the invention.

FIG. 19 is a plan view of the top pole 17 in which the shape of the coupling portion between the end portion 17D and the intermediate portion 17C is the same as the shape shown in FIG. 15 and both of outer angles of the step of the intermediate portion 17B are 90 degrees (i.e., γ is equal to 0 degree).

In FIGS. 13 to 19, the position where the end portion 17D is coupled to the intermediate portion 17C does not have to exactly match the TH0 position but may be shifted from the TH0 position within a range of, for example, about plus or minus 0.5 μm.

The thin film magnetic head having the top pole 17 shown in FIGS. 13 to 19 can obtain the same effect as the effect of the thin film magnetic head having the top pole 17 shown in FIG. 9.

[Second Embodiment]

Next, a second embodiment of the invention will be described.

First, a method of manufacturing a composite thin film magnetic head will be described as a method of manufacturing a thin film magnetic head according to the second embodiment of the invention with reference to FIGS. 20A and 20B to FIGS. 23A and 23B. Since the thin film magnetic head according to the embodiment is embodied by the method of manufacturing a thin film magnetic head according to the embodiment, the thin film magnetic head will be described below in conjunction with the method of manufacturing a thin film magnetic head. FIGS. 20A, 21A, 22A and 23A show a cross section perpendicular to the air bearing surface. FIGS. 20B, 21B, 22B and 23B show a cross section of the magnetic pole parallel to the air bearing surface. In FIGS. 20A and 20B to FIGS. 23A and 23B, the same elements as the elements of the above-described embodiment are indicated by the same reference numerals.

In the method of manufacturing a thin film magnetic head according to the embodiment, the steps before the formation of the bottom pole 7 shown in FIGS. 20A and 20B are the same till halfway of the steps of the above-described first embodiment shown in FIGS. 3A and 3B, and thus the description thereof is omitted.

In the embodiment, after the formation of the bottom pole 7 is finished as shown in FIGS. 20A and 20B, the write gap layer 9 is formed and an insulating film pattern 25 for defining the throat height TH is formed on the write gap layer 9 as shown in FIGS. 21A and 21B. Then, the write gap layer 9 is partially etched at the rear of the region where thin film coils 29 are to be formed by the following step (on the right side in FIG. 21A) in order to form the magnetic path, whereby an opening 9B is formed. Then, a top pole chip 27A for constituting a part of the top pole is selectively formed by, for example, electroplating in the region between the insulating film pattern 25 and the portion to be a track-facing surface (the air bearing surface). At the same time, a pattern 27B for forming the magnetic path is formed also in the opening 9B. A material having high saturation magnetic flux density, such as a permalloy (NiFe) alloy or an iron nitride (FeN) alloy, is used as the top pole chip 27A and the pattern 27B for forming the magnetic path.

The top pole chip 27A and the pattern 27B for forming the magnetic path are formed in the following manner, for example. That is, first, a NiFe alloy, a material having high saturation magnetic flux density is formed with a thickness of about 70 nm by, for example, sputtering, whereby the electrode film (not shown) to be used as the seed layer for electroplating is formed. Then, the above-mentioned electrode film is coated with the photoresist, the photoresist is patterned by photolithography, and the photoresist pattern (not shown) is formed by frame plating. Then, the top pole chip 27A and the pattern 27B for forming the magnetic path are formed with a thickness of about 3 μm to 5 μm by electroplating using the photoresist pattern as the mask and using the preformed electrode film as the seed layer. After that, the photoresist pattern is removed. The top pole chip 27A has the shape shown in FIGS. 24 and 25, for example. The shape of the top pole chip 27A will be described later.

Then, the write gap layer 9 and the bottom pole 7 are etched by about 0.3 μm to 0.5 μm by means of, for example, ion milling using the top pole chip 27A as the mask, whereby the trim structure for preventing the increase in an effective track width during writing is formed.

Then, an insulating film 28 such as an alumina film is formed over the whole surface with a thickness of about 0.5 μm to 1.5 μm. Then, the thin film coils 29 made of, for example, copper (Cu) for the inductive recording head are formed with a thickness of 2 μm to 3 μm by electroplating, for example. Then, an insulating layer 30 such as an alumina film is formed over the whole surface with a thickness of about 3 μm to 4 μm. Then, the overall surface is polished and flattened by, for example, CMP (Chemical Mechanical Polishing), whereby the surfaces of the top pole chip 27A and the pattern 27B for forming the magnetic path are exposed.

Figures 22A, 22B:
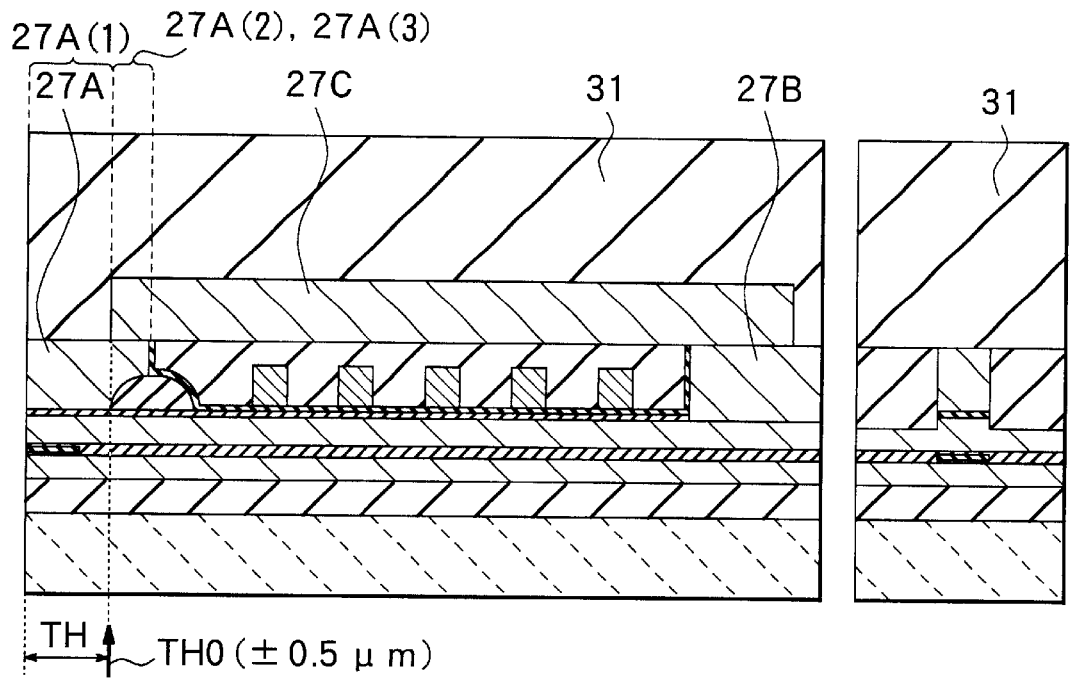
FIGS. 22A and 22B are cross sectional views for describing the step following the step of FIGS. 21A and 21B.

Then, as shown in FIGS. 22A and 22B, a top yoke-cum-top pole (hereinafter referred to as a top pole) 27C is formed with a thickness of about 3 μm to 5 μm by electroplating in the same manner as the step of forming the top pole chip 27A and the pattern 27B for forming the magnetic path. The top pole 27C has the plan shape shown in FIG. 24, for instance. The top pole 27C is in contact with and magnetically coupled to the bottom pole 7 in the above-mentioned opening 9B and is also in contact with and magnetically coupled to the top pole chip 27A. For example, a high-saturation magnetic material such as permalloy (NiFe) or iron nitride (FeN) is used as the top pole 27C. The top pole 27C corresponds to "a fourth magnetic layer portion" of the invention.

Then, an overcoat layer 38 made of, for example, alumina is formed so as to coat the overall surface. Finally, the slider is machined, whereby the air bearing surface (track surface) of the recording head and the reproducing head is formed. As a result, the thin film magnetic head is completed.

Figures 23A, 23B:
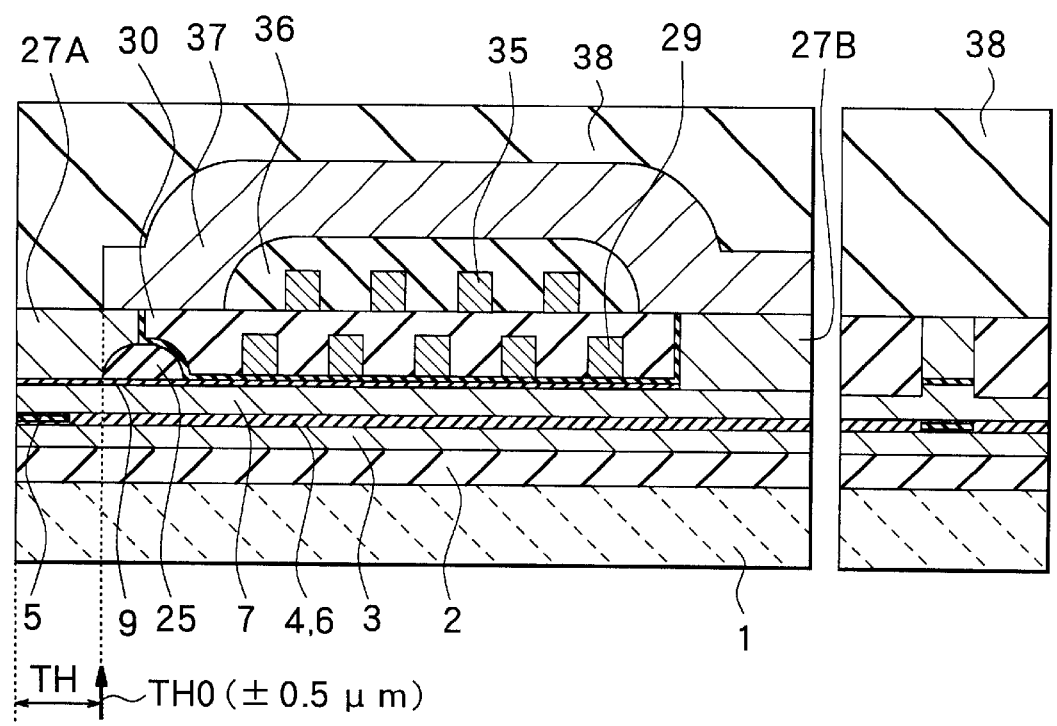
FIGS. 23A and 23B are cross sectional views of a modification of the thin film magnetic head according to the second embodiment of the invention.

In the embodiment, only the single-layer thin film coils 29 are formed. However, the following structure may be formed. That is, as shown in FIG. 23A, second-layer thin film coils 35 are formed on the insulating layer 30 coating the thin film coils 29, then the thin film coils 35 are coated with a photoresist layer 36, and then a top pole 37 is selectively formed on the photoresist layer 36.

Figure 24:
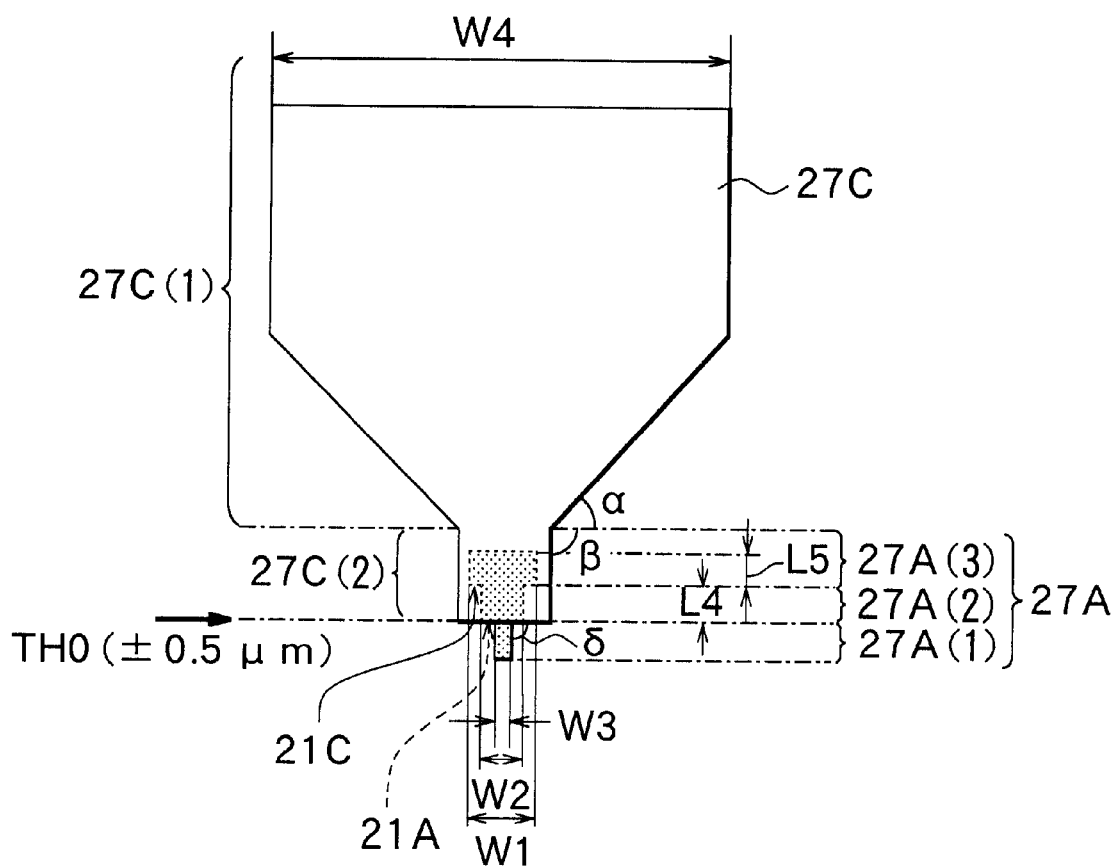
FIG. 24 is a plan view of the plan structure of a top pole and a top pole chip of the thin film magnetic head according to the second embodiment of the invention.
Figure 25:
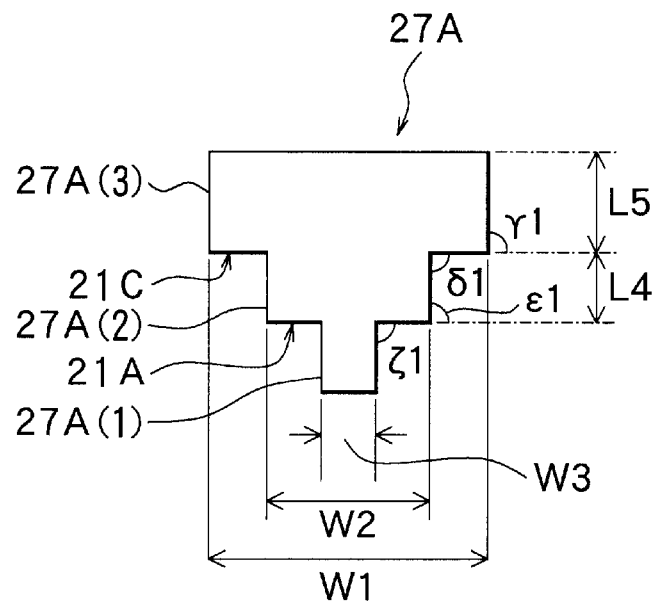
FIG. 25 is an enlarged plan view of the plan structure of the top pole chip shown in FIG. 24.

FIG. 24 shows the plan structure of the top pole 27C and the top pole chip 27A. FIG. 25 shows the plan structure of the top pole chip 27A. As shown in FIG. 24, the top pole 27C has a yoke portion 27C(1) having the width W4 and occupying most of the top pole 27C, and a connection portion 27C(2) partially overlapping and connected to the top pole chip 27A. The shape of the yoke portion 27C(1) is the same as the shape of the yoke portion 17A of the top pole 17 of the above-described first embodiment. The width of the connection portion 27C(2) is wider than the width of the intermediate portion 17C of the top pole 17 of the above-described first embodiment. The centers of the yoke portion 27C(1) and the connection portion 27C(2) along the width match each other.

As shown in FIG. 25, the top pole chip 27A has an end portion 27A(1) for defining the write track width on the recording medium, and intermediate portions 27A(2) and 27A(3) connected to the connection portion 27C(2) of the top pole 27C. The intermediate portion 27A(2) has the width W2 corresponding to the width of the intermediate portion 17C of the top pole 17 of the above-described first embodiment. The intermediate portion 27A(2) has the length L4. The intermediate portion 27A(3) has the width W1 corresponding to the width of the intermediate portion 17B of the top pole 17 of the above-described first embodiment. The intermediate portion 27A(3) has a length L5. The end portion 27A(1) has the width W3 corresponding to the width of the end portion 17D of the above-described first embodiment. The coupling portion between the end portion 27A(1) and the intermediate portion 27A(2) substantially matches the TH0 position and also matches a front edge face of the connection portion 27C(2) of the top pole 27C (the edge face on the side of the air bearing surface).

At the coupling portion (i.e., substantially at the TH0 position), the width of the intermediate portion 27A(2) is W2, and the width of the end portion 27A(1) is W3 that is smaller than W2. The width of the intermediate portion 27A(3) is W1 that is larger than the width W2 of the intermediate portion 27A(2). In the top pole chip 27A, the width W3 of the end portion 27A(1), the width W2 of the intermediate portion 27A(2) and the width W1 of the intermediate portion 27A(3) are set so that W3<W2<W1 holds. That is, the top pole chip 27A has a step face 21C along the width at the coupling portion between the intermediate portion 27A(3) and the intermediate portion 27A(2). The top pole chip 27A also has the step face 21A along the width at the coupling portion between the intermediate portion 27A(2) and the end portion 27A(1).

The step face 21A along the width at the coupling portion between the intermediate portion 27A(2) and the end portion 27A(1) is located at the TH0 position or near the TH0 position. The step face 21C on the side of the intermediate portion 27A(3) at the coupling portion between the intermediate portion 27A(3) and the intermediate portion 27A(2) forms an angle $\gamma 1$ with the side surface of the intermediate portion 27A(3). The step face 21C forms an angle $\delta 1$ with the side edge face of the intermediate portion 27A(2). The step face 21A on the side of the intermediate portion 27A(2) at the coupling portion between the intermediate portion 27A(2) and the end portion 27A(1) forms an angle $\in 1$ with the side surface of the intermediate portion 27A(2). The step face 21A forms an angle $\zeta 1$ with the side edge face of the end portion 27A(1). In the embodiment, all of the angles $\gamma 1$, $\delta 1$, $\in 1$ and $\zeta 1$ are about 90 degrees. That is, all of the intermediate portion 27A(3), the intermediate portion 27A(2) and the end portion 27A(1) are rectangular, and the step faces 21A and 21C are substantially perpendicular to the side edge faces of the end portion 27A(1) and the intermediate portion 27A(2). The end portion 27A(1) corresponds to "a first magnetic layer portion" of the invention. The intermediate portion 27A(2) corresponds to "a second magnetic layer portion" of the invention. The intermediate portion 27A(3) corresponds to "a third magnetic layer portion" of the invention.

As is apparent from FIGS. 22A, 22B and 24, the end portion 27A(1) extends on the flat write gap layer 9, and the intermediate portion 27A(2) and the intermediate portion 27A(3) are located on the insulating film pattern 25.

Preferably, the dimensions of the portions shown in FIG. 24 have the following values, for instance.

The width W1 of the intermediate portion 27A(3) is equal to 2.0 $\mu$m to 5.0 $\mu$m.

The width W2 of the intermediate portion 27A(2) is equal to 1.0 $\mu$m to 3.0 $\mu$m.

The width W3 of the end portion 27A(1) is equal to 40.0 $\mu$m.

The width W4 of the yoke portion 27C(1) is equal to 15.0 $\mu$m to 40.0 $\mu$m.

The length L4 of the intermediate portion 27A(2) is equal to 1.0 $\mu$m to 2.0 $\mu$m.

The length L5 of the intermediate portion 27A(3) is equal to 1.0 $\mu$m to 4.0 $\mu$m.

The length of the connection portion 27C(2) is equal to 3.0 $\mu$m to 5.0 $\mu$m.

The thin film magnetic head having the top pole 17 having the above-mentioned shape delivers high performance in overwrite properties for the same reason as the above-described first embodiment. The thin film magnetic head having the top pole 27C and the top pole chip 27A having the above-mentioned shape has the same advantage as the above-described first embodiment in the manufacturing process.

That is, according to the thin film magnetic head of the embodiment, the write track width can be reduced by preventing the increase in the pattern width of the photoresist for forming the end portion 27A(1) of the top pole chip 27A. Also, the magnetic flux generated in the yoke portion 27C(1) is prevented from being saturated before reaching to the end portion 27A(1) of the top pole chip 27A, and therefore sufficient overwrite properties can be ensured.

Moreover, in the embodiment, the top pole 27C can be formed on the flat portion subjected to CMP. Therefore, the photoresist pattern can be formed with high accuracy by photolithography.

Moreover, in the embodiment, the thick insulating film 28 made of alumina or the like is formed between the write gap layer 9 and the thin film coils 10. Therefore, the dielectric withstand voltage between the thin film coils 10 and the bottom pole 7 can be increased, and the leakage of the magnetic flux from the thin film coils 10 can be reduced.

Next, some modifications of the embodiment will be described.

Figure 26:
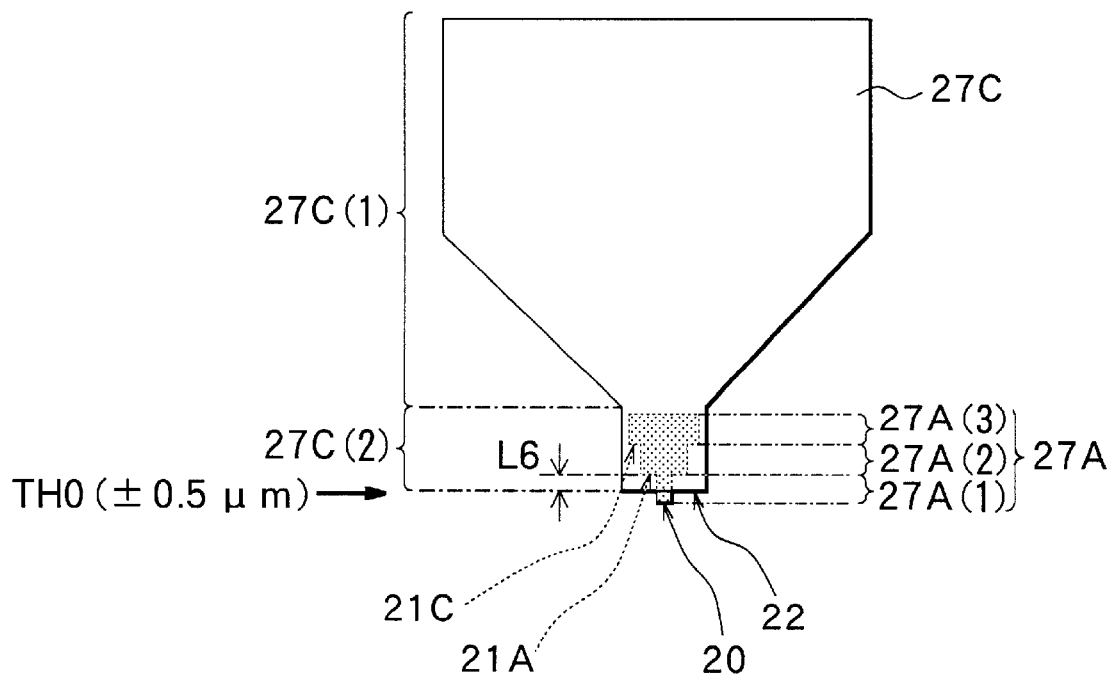
FIG. 26 is a plan view of another modification of the top pole and the top pole chip shown in FIG. 24.

The position of a front edge face 22 of the connection portion 27C(2) of the top pole 27C (i.e., the edge face on the side of the air bearing surface) does not have to exactly match the position of the step face 21A of the top pole chip 27A matching the TH0 position. For example, as shown in FIG. 26, the connection portion 27C(2) of the top pole 27C may extend so that the position of the front edge face 22 thereof (i.e., the edge face on the side of the air bearing surface) also overlaps a part of the end portion 27A(1) across the position of the step face 21A of the top pole chip 27A. The edge face 22 of the connection portion 27C(2) at the overlapping portion is perpendicular to the direction in which the end portion 27A(1) extends, i.e., the direction of a side edge face 23 of the end portion 27A(1). Preferably, a length L6 of shift from the front edge face 22 of the connection portion 27C(2) of the top pole 27C (i.e., the edge face on the side of the air bearing surface) to the step face 21A located at the coupling portion between the end portion 27A(1) and the intermediate portion 27A(2) of the top pole chip 27A is 0.1 μm or less. Preferably, the TH0 position is not located at the position of the step face 21A of the top pole chip 27A but matches the position of the edge face 22 of the connection portion 27C(2). The configuration of the other elements and the method of manufacturing the other elements are the same as those of the above-described second embodiment. For example, a sectional structure across the end portion 27A(1) and along the surface perpendicular to the air bearing surface 20 is substantially the same as the structure shown in FIGS. 22A and 22B or FIGS. 23A and 23B.

Figure 27:
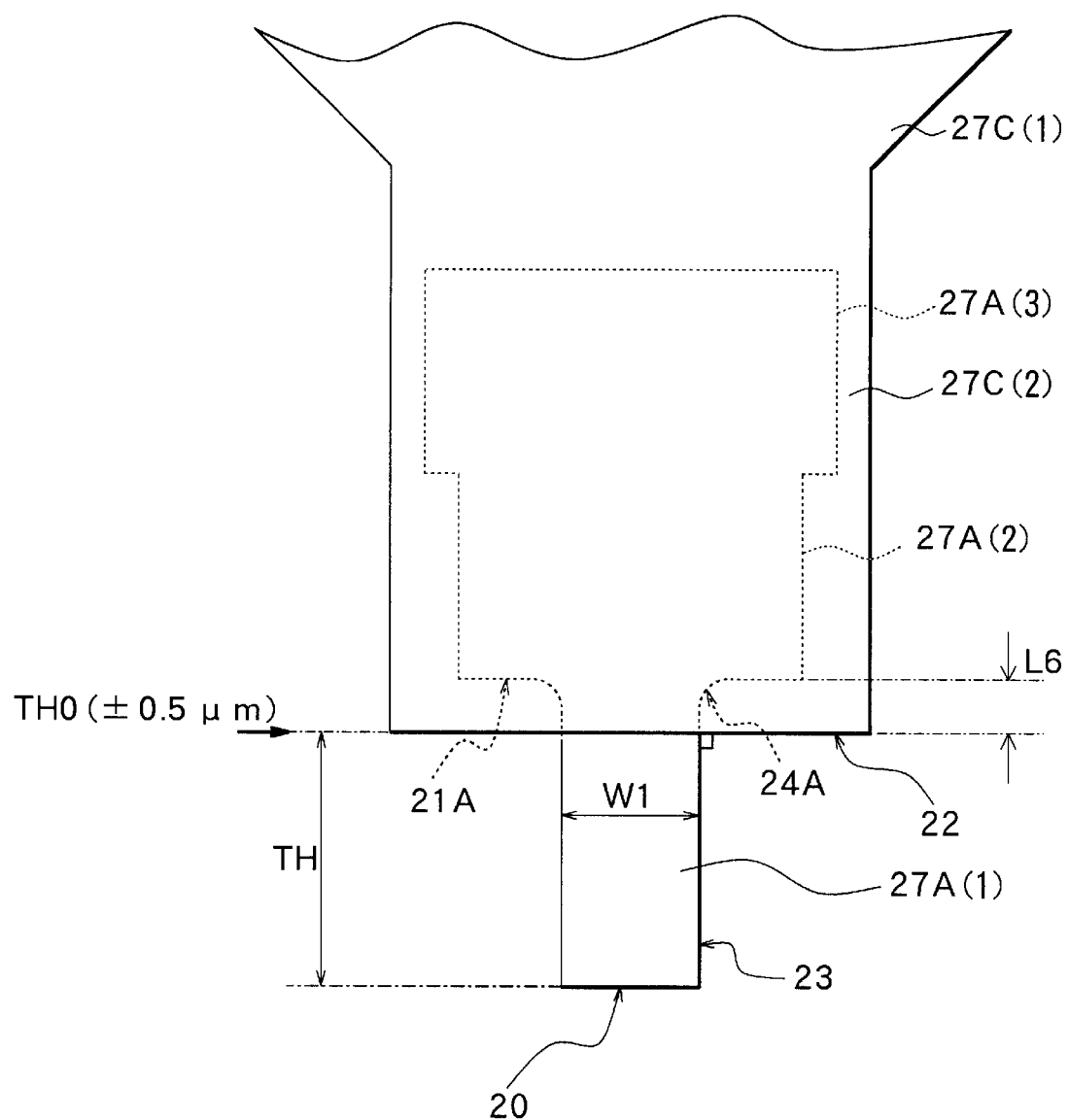
FIG. 27 is an enlarged plan view of a principal part of the top pole and the top pole chip shown in FIG. 26.

As described above with reference to FIGS. 22A and 22B, photolithography for forming the top pole chip 27A is performed independently of photolithography for forming the top pole 27C. Therefore, the side edge face 23 of the end portion 27A(1) always forms a sharp right angle with the connection portion 27C(2) of the top pole 27C, even if the corner of the photoresist is rounded because of poor exposure for photolithography for forming the top pole chip 27A and thus an intersection 24A of the step face 21A of the top pole chip 27A and the side edge face 23 of the end portion 27A(1) is not sharply right-angled but is rounded as shown in FIG. 27, for example. That is, the width of the end portion 27A(1) for defining the track width on the recording medium can be exactly equal to W3 over the whole region between the TH0 position and the air bearing surface 20 (i.e., the overall throat height TH). Therefore, even when the width W3 of the end portion 27A(1) is reduced to 1 μm or less or 0.5 μm or less in accordance with a reduction in the track width, the width W3 of the end portion 27A(1) does not increase near the TH0 position. More particularly, even when the throat height TH is reduced from a conventional dimension, i.e., about 1 μm to 0.5 to 0.2 μm in order to obtain the thin film magnetic head having higher performance, the width W1 exactly designed can be ensured over the overall throat height TH. Preferably, the length L6 of shift from the front edge face 22 of the connection portion 27C(2) of the top pole 27C (i.e., the edge face on the side of the air bearing surface) to the step face 21A located at the coupling portion between the end portion 27A(1) and the intermediate portion 27A(2) of the top pole chip 27A is 0.1 μm or less. Thus, the write track width on the recording medium can be precisely controlled. Therefore, it is possible to effectively prevent the occurrence of a side-write phenomenon that data to be written on one track is written on another track adjacent to the track.

In the embodiment, the connection portion 27C(2) extending at a right angle is located immediately at the rear of the TH0 position of the end portion 27A(1), and the intermediate portion 27A(2) is located immediately at the rear of the step face 21A. Thus, a sufficient magnetic volume can be ensured by the connection portion 27C(2) and the intermediate portion 27A(2). Therefore, the magnetic flux generated in the yoke portion 27C(1) can be effectively prevented from being saturated before reaching to the end portion 27A(1) of the top pole chip 27A. Accordingly, sufficient overwrite properties can be ensured.

Figure 28:
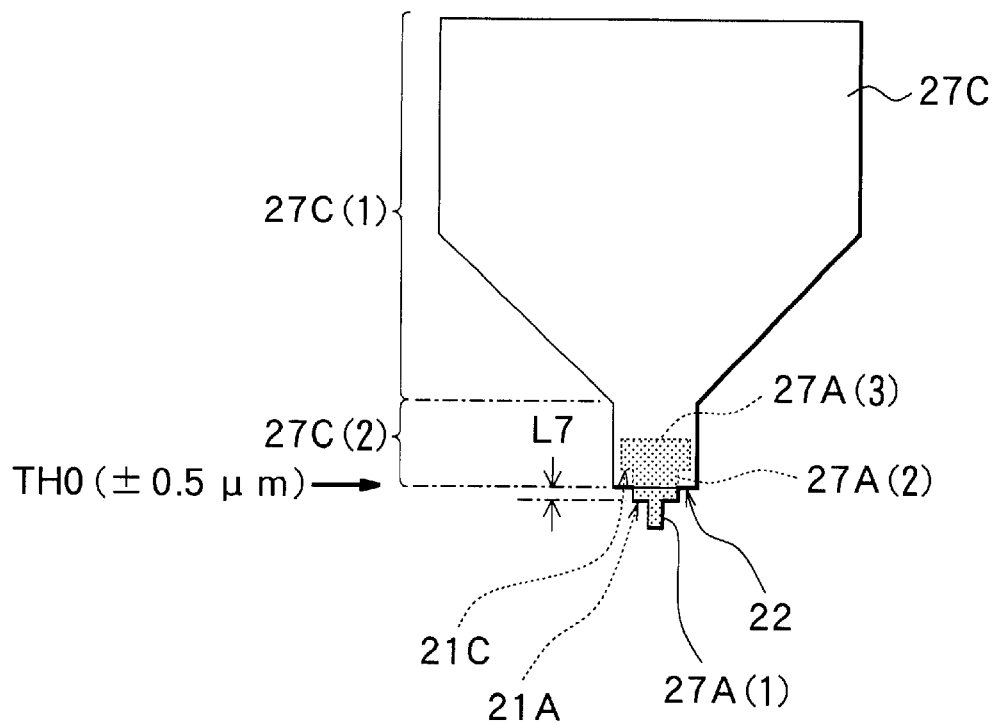
FIG. 28 is a plan view of still another modification of the top pole and the top pole chip shown in FIG. 24.

As shown in FIG. 28, the position of the edge face 22 of the connection portion 27C(2) may be shifted rearward (in the direction opposite to the air bearing surface) from the position of the step face 21A. Preferably, a length L7 of shift from the front edge face 22 of the connection portion 27C(2) of the top pole 27C (i.e., the edge face on the side of the air bearing surface) to the TH0 position matching the position of the step face 21A located at the coupling portion between the end portion 27A(1) and the intermediate portion 27A(2) is 0.1 μm or less.

Figure 29:
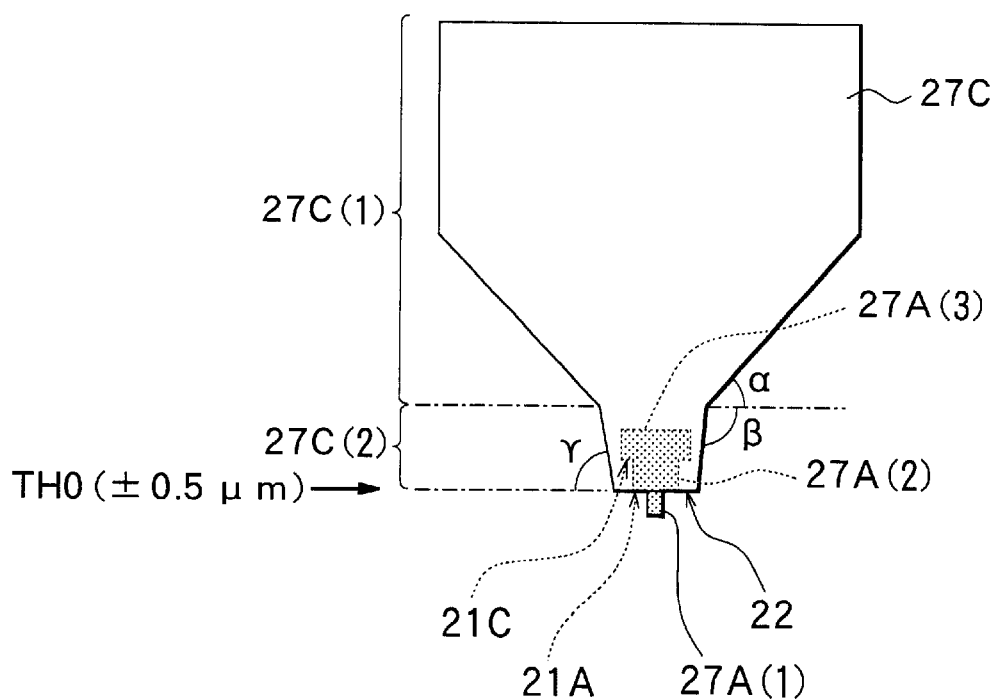
FIG. 29 is a plan view of a further modification of the top pole and the top pole chip shown in FIG. 24.

As shown in FIG. 29, the connection portion 27C(2) of the top pole 27C may be tapered. In FIG. 29, it is preferable that the taper angle δ of the connection portion 27C(2) of the top pole 27C is within a range of, for example, from 45 degrees to 60 degrees with respect to the edge face 22 of the connection portion 27C(2).

Also in this case, the position of the front edge face 22 of the connection portion 27C(2) does not have to exactly match the position of the step face 21A of the top pole chip 27A matching the TH0 position. Although not shown, the connection portion 27C(2) of the top pole 27C may extend so that the position of the front edge face 22 thereof (i.e., the edge face on the side of the air bearing surface) also overlaps a part of the end portion 27A(1) across the position of the step face 21A of the top pole chip 27A. The edge face 22 of the connection portion 27C(2) at the overlapping portion is perpendicular to the direction in which the end portion 27A(1) extends, i.e., the direction of the side edge face 23 of the end portion 27A(1). Preferably, the length of shift from the front edge face 22 of the connection portion 27C(2) of the top pole 27C (i.e., the edge face on the side of the air bearing surface) to the step face 21A located at the coupling portion between the end portion 27A(1) and the intermediate portion 27A(2) of the top pole chip 27A is 0.1 μm or less. Preferably, the TH0 position is not located at the position of the step face 21A of the top pole chip 27A but matches the position of the edge face 22 of the connection portion 27C(2).

Although not shown, the position of the front edge face 22 of the connection portion 27C(2) may be shifted rearward (in the direction opposite to the air bearing surface) from the position of the step face 21A of the top pole chip 27A. Preferably, the length of shift from the front edge face 22 of the connection portion 27C(2) of the top pole 27C (i.e., the edge face on the side of the air bearing surface) to the TH0 position matching the position of the step face 21A located at the coupling portion between the end portion 27A(1) and the intermediate portion 27A(2) is 0.1 μm or less.

Figure 30:
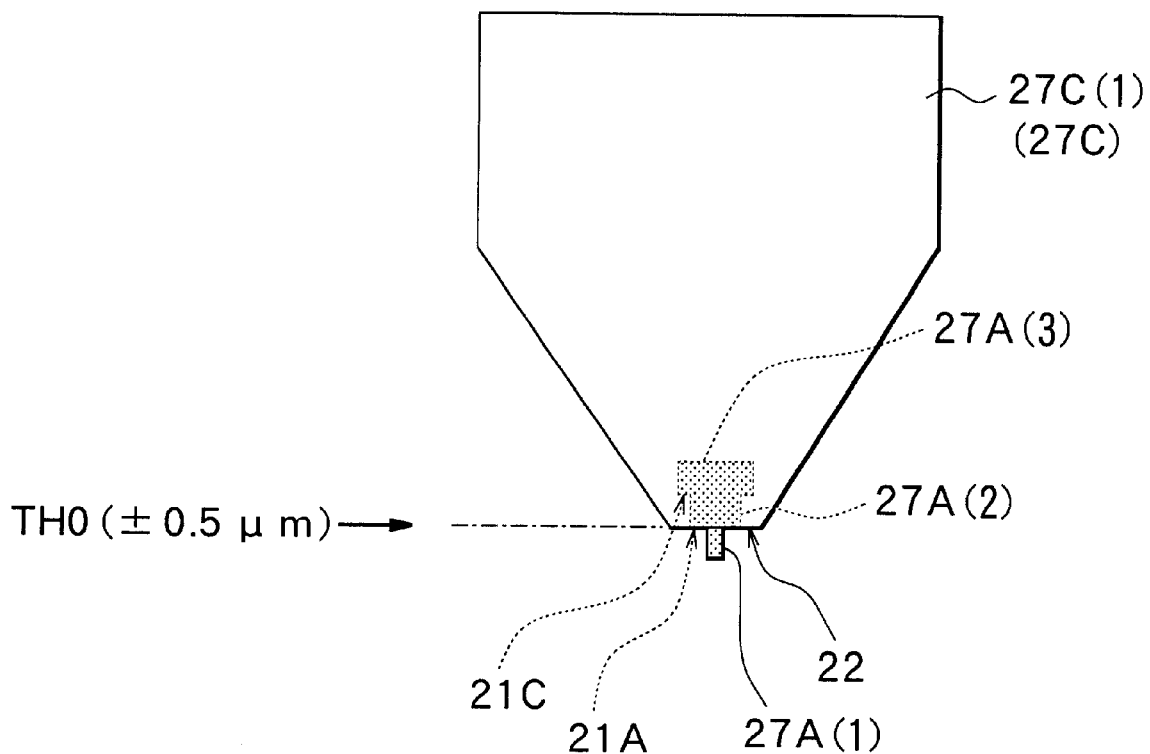
FIG. 30 is a plan view of a further modification of the top pole and the top pole chip shown in FIG. 24.

The connection portion 27C(2) of the top pole 27C of the above-described second embodiment (see FIG. 24) is not essential but may be eliminated. For example, as shown in FIG. 30, the top pole 27C comprises only the yoke portion 27C(1), and a part of the yoke portion 27C(1) overlaps the intermediate portion 27A(2) and the intermediate portion 27A(3) of the top pole chip 27A. In FIG. 30, the position of the front edge face 22 of the yoke portion 27C(1) of the top pole 27C matches the position of the step face 21A of the top pole chip 27A.

Also in this case, the position of the front edge face 22 of the yoke portion 27C(1) does not have to exactly match the position of the step face 21A of the top pole chip 27A matching the TH0 position. Although not shown, the yoke portion 27C(1) of the top pole 27C may extend so that the position of the front edge face 22 thereof (i.e., the edge face on the side of the air bearing surface) also overlaps a part of the end portion 27A(1) across the position of the step face 21A of the top pole chip 27A. The edge face 22 of the yoke portion 27C(1) at the overlapping portion is perpendicular to the direction in which the end portion 27A(1) extends, i.e., the direction of the side edge face 23 of the end portion 27A(1). Preferably, the length of shift from the front edge face 22 of the yoke portion 27C(1) of the top pole 27C (i.e., the edge face on the side of the air bearing surface) to the step face 21A located at the coupling portion between the end portion 27A(1) and the intermediate portion 27A(2) of the top pole chip 27A is 0.1 μm or less. The TH0 position matches not the position of the step face 21A of the top pole chip 27A but the position of the edge face 22 of the yoke portion 27C(1).

Although not shown, the position of the front edge face 22 of the yoke portion 27C(1) may be shifted rearward (in the direction opposite to the air bearing surface) from the position of the step face 21A of the top pole chip 27A. Preferably, the length of shift from the front edge face 22 of the yoke portion 27C(1) of the top pole 27C (i.e., the edge face on the side of the air bearing surface) to the TH0 position matching the position of the step face 21A located at the coupling portion between the end portion 27A(1) and the intermediate portion 27A(2) is 0.1 μm or less.

The shape of the top pole chip 27A is not limited to the shape shown in FIG. 25 but may be any one of the shapes shown in FIGS. 31 to 35, for example.

Figure 31:
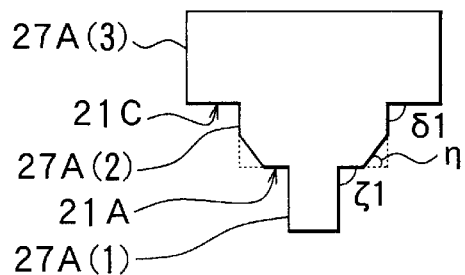
FIG. 31 is a plan view of a modification of the top pole chip shown in FIG. 25.

FIG. 31 is a plan view of the top pole chip 27A in which both of outer corners of the step face 21A of the intermediate portion 27A(2) are chamfered. The structure of any portion other than the chamfered portion is the same as the structure shown in FIG. 25. Preferably, a chamfer angle η is, for example, 30 degrees to 60 degrees with respect to the step face 21A. The top pole chip 27A shown in FIG. 25 is replaced with the top pole chip 27A having the shape shown in FIG. 31. Thus, the thin film magnetic head having substantially the same performance can be obtained. Also in this case, when the edge face 22 of the top pole 27C is shifted rearward (in the direction opposite to the air bearing surface) from the step face 21A of the top pole chip 27A (e.g., FIG. 26), or when the edge face 22 of the top pole 27C also overlaps a part of the end portion 27A(1) across the step face 21A of the top pole chip 27A (e.g., FIG. 28), it is preferable that the length of shift from the edge face 22 of the top pole 27C to the step face 21A of the top pole chip 27A is 0.1 μm or less.

Figure 32:
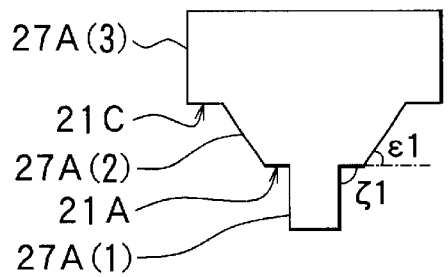
FIG. 32 is a plan view of another modification of the top pole chip shown in FIG. 25.

FIG. 32 is a plan view of the top pole chip 27A in which the intermediate portion 27A(2) is tapered. In FIG. 32, it is preferable that the taper angle El of the intermediate portion 27A(2) of the top pole chip 27A is within a range of, for example, from 60 degrees to 80 degrees with respect to the step face 21A. The structure of any portion other than the tapered portion is the same as the structure shown in FIG. 25. Also in this case, as described above with reference to FIG. 31, the top pole chip 27A shown in FIGS. 24 to 30 is replaced with the top pole chip 27A having the shape shown in FIG. 32, whereby the thin film magnetic head having substantially the same performance can be obtained. Preferably, the length of shift from the edge face 22 of the top pole 27C to the step face 21A of the top pole chip 27A is 0.1 μm or less.

Figure 33:
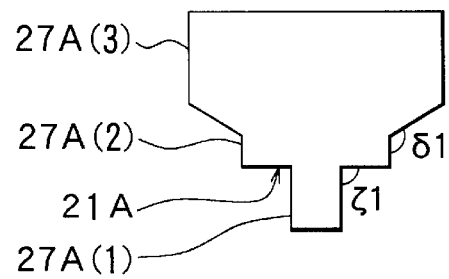
FIG. 33 is a plan view of still another modification of the top pole chip shown in FIG. 25.

FIG. 33 is a plan view of the top pole chip 27A in which the shape of the step at the coupling portion between the end portion 27A(1) and the intermediate portion 27A(2) of the top pole chip 27A is the same as the shape shown in FIG. 31 and the angle δ1 between the step face 21c between the intermediate portions 27A(3) and 27A(2) and the side edge face of the intermediate portion 27A(2) is larger than 90 degrees at the coupling portion between the intermediate portions 27A(3) and 27A(2). The angle δ1 is about 135 degrees, for example. Also in this case, as described above with reference to FIG. 31, the top pole chip 27A shown in FIGS. 24 to 30 is replaced with the top pole chip 27A having the shape shown in FIG. 33, whereby the thin film magnetic head having substantially the same performance can be obtained. Preferably, the length of shift from the edge face 22 of the top pole 27C to the step face 21A of the top pole chip 27A is 0.1 μm or less.

Figure 34:
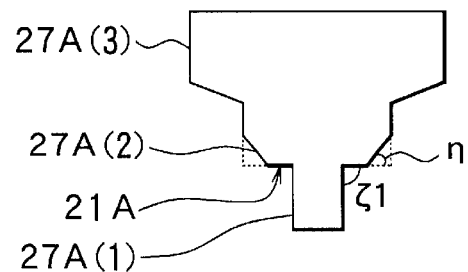
FIG. 34 is a plan view of a further modification of the top pole chip shown in FIG. 25.

FIG. 34 is a plan view of the top pole chip 27A in which the shape of the step at the coupling portion between the end portion 27A(1) and the intermediate portion 27A(2) of the top pole chip 27A is the same as the shape shown in FIG. 31 and the angle δ1 between the step face 21c between the intermediate portions 27A(3) and 27A(2) and the side edge face of the intermediate portion 27A(2) is larger than 90 degrees at the coupling portion between the intermediate portions 27A(3) and 27A(2). The angle δ1 is about 135 degrees, for example. Also in this case, as described above with reference to FIG. 31, the top pole chip 27A shown in FIGS. 24 to 30 is replaced with the top pole chip 27A having the shape shown in FIG. 34, whereby the thin film magnetic head having substantially the same performance can be obtained. Preferably, the length of shift from the edge face 22 of the top pole 27C to the step face 21A of the top pole chip 27A is 0.1 μm or less.

Figure 35:
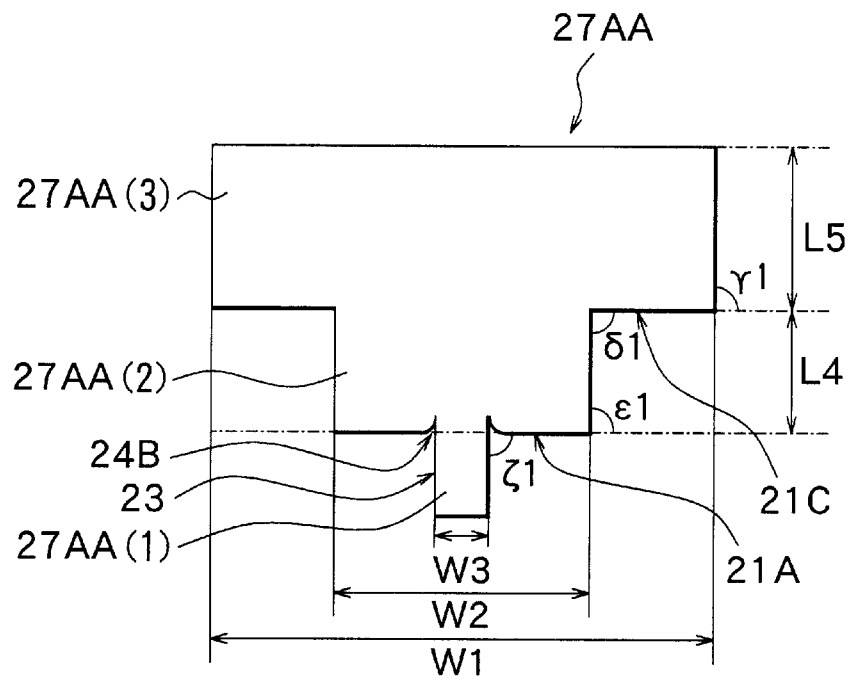
FIG. 35 is a plan view of the top pole chip having a wedge notch.

FIG. 35 is a plan view of a top pole chip 27AA having a wedge notch 24B at the coupling portion between an end portion 27AA(1) and an intermediate portion 27AA(2). In the top pole chip 27AA shown in FIG. 35, the dimensions (W1, W2, W3, L4 and L5) of the magnetic layer portions and the coupling angles (γ1, δ1, ∈1 and ζ1) are identical with those of the top pole chip 27A shown in FIG. 25.

Figure 36:
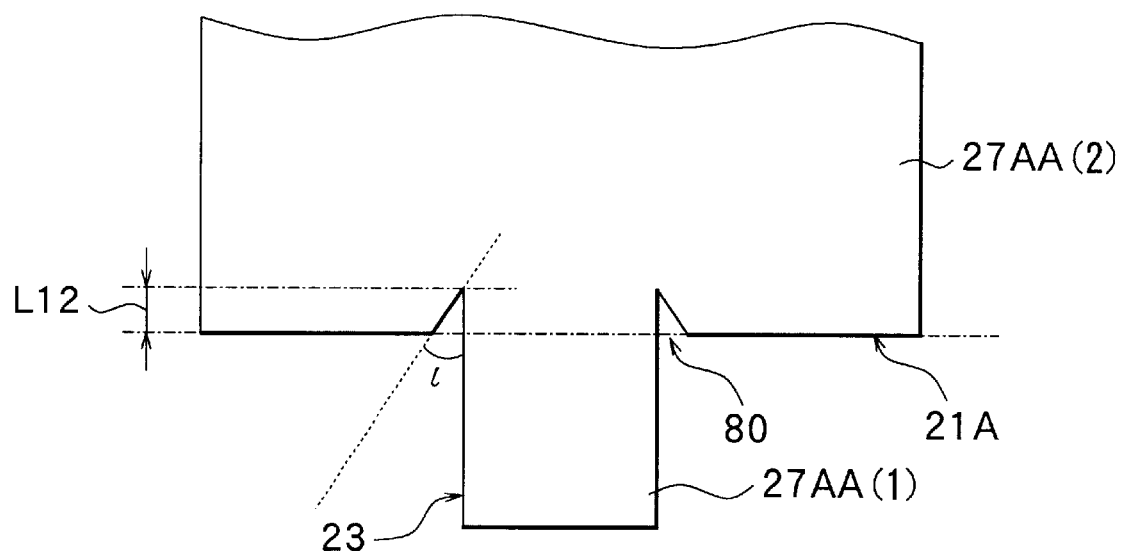
FIG. 36 is an enlarged plan view of a principal part of the top pole chip shown in FIG. 35.

FIG. 36 is an enlarged view of a portion near the wedge notch 24B shown in FIG. 35. A depth L12 of the wedge notch 24B relative to the step face 21A is within a range of from 0.3 μm to 0.8 μm, or more preferably the depth L12 is about 0.6 μm. Preferably, an angle ι of the wedge notch 24B to the side edge face 23 of the end portion 27AA(1) is within a range of 45±15 degrees.

For example, the top pole chip 27A shown in FIG. 25 is formed by, for example, electroplating using the photoresist patterned by exposure through a photomask having a shape corresponding to a desired shape of the top pole chip. The top pole chip 27AA shown in FIG. 35 having the wedge notches 24B at the corners thereof is obtained by using the photomask having a wedge notch or protrusion having substantially the same shape as the wedge notch 24B at each of the portions corresponding to the wedge notches 24B.

The top pole chip 27AA shown in FIG. 35 can be replaced with the top pole chip 27A shown in FIGS. 24 and 26 and FIGS. 28 to 30. The shape of the top pole chip 27AA may be any one of the shapes shown in FIGS. 31 to 34 as long as the top pole chip 27AA has the wedge notch 24B.

In the second embodiment, the description has been given with regard to an example in which the top pole of the thin film magnetic head has two separate parts, i.e., the top pole 27C and the top pole chip 27A and the whole thin film magnetic head has the sectional structure shown in FIGS.

23A and 23B. However, the invention is not limited to the above-mentioned example. The thin film magnetic head may have a cross section of third and fourth embodiments described below.

[Third Embodiment]

Figures 37A, 37B:
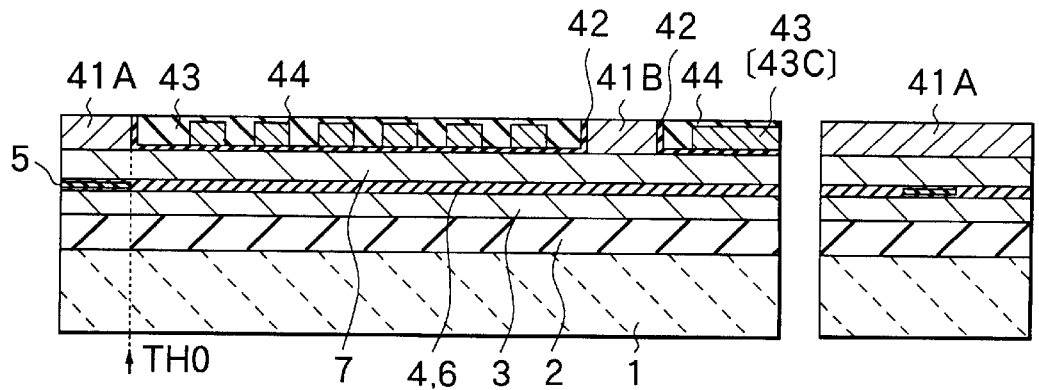
FIGS. 37A and 37B are cross sectional views for describing a step of a method of manufacturing a thin film magnetic head according to a third embodiment of the invention.
Figures 38A, 38B:
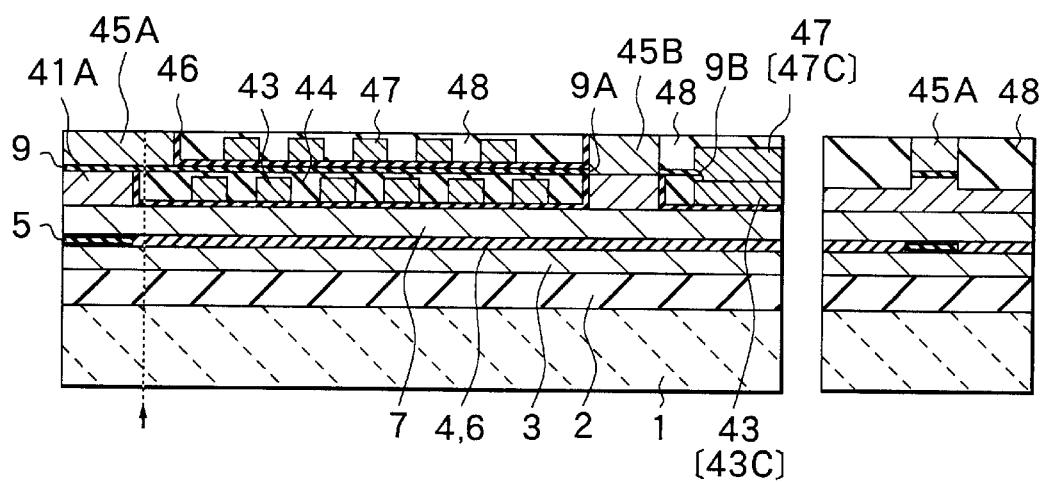
FIGS. 38A and 38B are cross sectional views for describing the step following the step of FIGS. 37A and 37B.
Figure 39A:
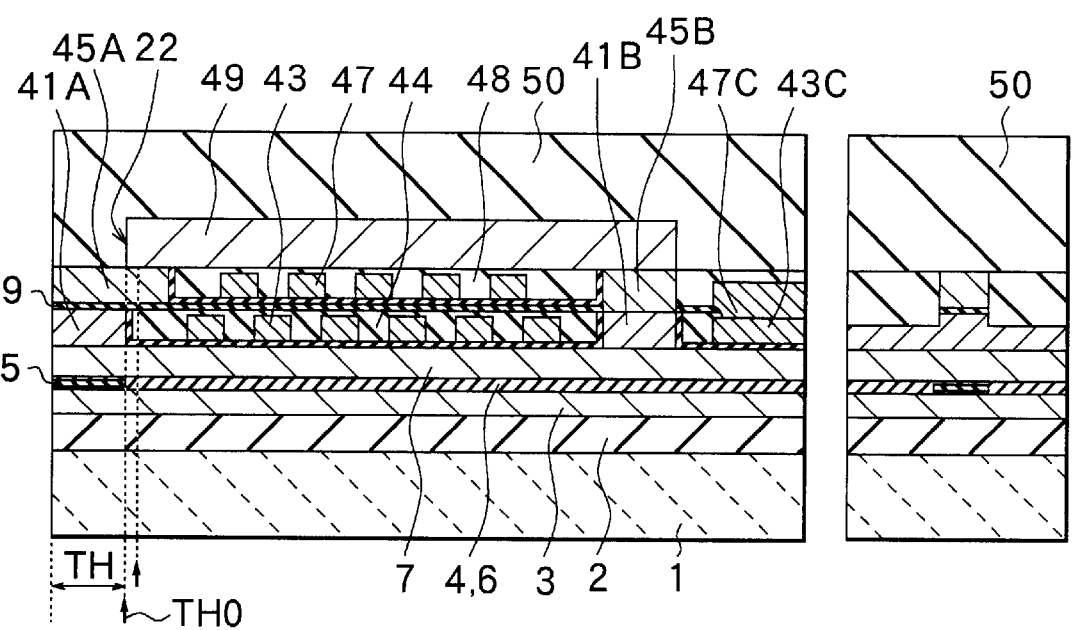
FIGS. 39A and 39B are cross sectional views for describing the step following the step of FIGS. 38A and 38B.
Figure 39B:
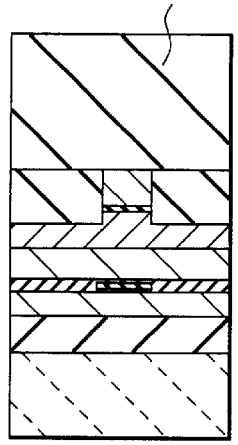

Next, a method of manufacturing a composite thin film magnetic head will be described as a method of manufacturing a thin film magnetic head according to a third embodiment of the invention with reference to FIGS. 37A and 37B to FIGS. 39A and 39B. Since the thin film magnetic head according to the embodiment is embodied by the method of manufacturing a thin film magnetic head according to the embodiment, the thin film magnetic head will be described below in conjunction with the method of manufacturing a thin film magnetic head. FIGS. 37A, 38A and 39A show a cross section perpendicular to the air bearing surface. FIGS. 37B, 38B and 39B show a cross section of the magnetic pole parallel to the air bearing surface. In FIGS. 37A and 37B to FIGS. 39A and 39B, the same elements as the elements of the above-described embodiments are indicated by the same reference numerals.

In the method of manufacturing a thin film magnetic head according to the embodiment, the steps before the formation of the bottom pole 7 shown in FIGS. 37A and 37B are the same as the steps of the above-described first embodiment shown in FIGS. 1A and 1B to FIGS. 3A and 3B, and thus the description thereof is omitted.

In the embodiment, as shown in FIGS. 37A and 37B, the formation of the bottom pole 7 is finished, and then a bottom pole chip 41A and a bottom connection portion 41B are formed with a thickness of about 2.0 μm to 2.5 μm on the bottom pole 7. The bottom pole chip 41A is formed so that the end thereof on the side of the air bearing surface may be located near the position where the MR (GMR) height is equal to zero. Also, the bottom pole chip 41A is formed so that the side thereof opposite to the air bearing surface may be located at the position where the throat height is equal to zero. The bottom pole chip 41A and the bottom connection portion 41B may be made of a plated film such as NiFe or a sputtered film such as FeN, FeZrNP or CoFeN.

Then, an insulating film 42 of 0.3 μm to 0.6 μm thick made of an insulating material such as alumina is formed over the overall surface by sputtering or CVD, for example.

Then, first-layer thin film coils 43 made of, for example, copper (Cu) for the inductive recording head are formed with a thickness of 1.5 μm to 2.5 μm in a concave region between the bottom pole chip 41A and the bottom connection portion 41B by electroplating, for example. At the same time, a coil connection portion 43C for connecting the thin film coils 43 to second-layer thin film coils to be described later is formed in the rear region of the bottom connection portion 41B (the right region in FIG. 37A).

Then, an insulating layer 44 of 3.0 μm to 4.0 μm thick made of an insulating material, e.g., alumina is formed over the overall surface by sputtering. Then, the surface is flattened by, for example, CMP, whereby the surfaces of the bottom pole chip 41A and the bottom connection portion 41B are exposed.

Then, as shown in FIGS. 38A and 38B, the write gap layer 9 of 0.2 μm to 0.3 μm thick made of, for example, an alumina insulating material is formed by sputtering. The write gap layer 9 may be made of a material such as aluminum nitride (AlN), silicon oxide or silicon nitride, besides alumina. Then, the write gap layer 9 is patterned by photolithography, whereby the opening 9A for connecting the top pole to the bottom pole is formed. The write gap layer 9 and the insulating layer 44 are patterned, whereby the opening 9B extending to the coil connection portion 43C is formed.

Then, a top pole chip 45A and a top connection portion 45B for magnetically connecting the top pole to the bottom pole are formed on the write gap layer 9. At this time, the top connection portion 45B is formed so as to overlap and be in contact with the bottom connection portion 41B. On the other hand, the top pole chip 45A is formed so as to extend rearward from the air bearing surface and be longer than the bottom pole chip 41A. Similarly to the above-described second embodiment (see FIG. 26 and so on), the top pole chip 45A is formed so as to have the intermediate portion 27A(2) for ensuring the magnetic volume, the end portion 27A(1) for defining the track width and the step face 21A at the coupling portion between the intermediate portion 27A(2) and the end portion 27A(1). The top pole chip 45A has the plan shape shown in any one of FIG. 25 and FIGS. 31 to 34, for example. The top pole chip 45A is located so that the step face 21A thereof may be shifted slightly rearward from the position of a rear edge face of the bottom pole chip 41A (i.e., the TH0 position).

Then, the write gap layer 9 and the bottom pole chip 41A around the top pole chip 45A are etched in self-alignment by using the top pole chip 45A as the mask. That is, the write gap layer 9 is selectively removed by RIE (Reactive Ion Etching) using chlorine gas (Cl$_2$, CF$_4$, BCl$_2$, SF$_6$ or the like) by using the top pole chip 45A as the mask, and then the exposed bottom pole chip 41A is again etched by about 0.3 μm to 0.6 μm by ion milling using Ar, for example, whereby the trim structure is formed.

Then, an insulating layer 46 of about 0.3 μm to 0.6 μm thick made of, for example, alumina is formed over the overall surface by sputtering or CVD, for example. Then, second-layer thin film coils 47 made of, for example, copper (Cu) for the inductive recording head are formed by, for example, electroplating with a thickness of 1.5 μm to 2.5 μm on the insulating layer 46 in the concave region formed of the top pole chip 45A and the top connection portion 45B. At the same time, a coil connection portion 47C to be brought into contact with the coil connection portion 43C through the opening 9B is formed.

Then, an insulating layer 48 of about 3 μm to 4 μm thick made of, for example, alumina is formed over the overall surface by sputtering or CVD, for example. The insulating layer 48 and the insulating layer 46 are not limited to alumina but may be made of any other insulating material such as silicon dioxide (SiO$_2$) or silicon nitride (SiN).

Then, the insulating layer 48 and the insulating layer 46 are polished by, for instance, CMP so that the surfaces of the top pole chip 45A and the top connection portion 45B may be exposed, whereby the surfaces of the insulating layer 48 and the insulating layer 46 and the surfaces of the top pole chip 45A and the top connection portion 45B are flattened so as to form the same surface.

Then, as shown in FIGS. 39A and 39B, a top pole 49 is selectively formed with a thickness of about 3 μm to 4 μm by a method such as electroplating or sputtering by using the same material as the material of the top pole chip 45A, for example. In this case, the top pole 49 is formed so that a part of the top pole 49 may overlap a part of the top pole chip 45A and so that the position of the front edge face 22 of the top pole 49 (i.e., the edge face on the side of the air bearing surface) may match the position of the rear edge of the bottom pole chip 41A (i.e., the TH0 position). The top pole 49 is formed so that the rear end of the top pole 49 may be located on the top connection portion 45B. Thus, the top pole 49 is magnetically coupled to the top pole chip 45A and magnetically coupled to the bottom pole 7 through the top connection portion 45B and the bottom connection portion 41B.

Finally, an overcoat layer 50 of about 30 μm thick made of alumina is formed by, for example, sputtering so as to coat the overall surface. Then, the slider is machined, whereby the air bearing surface (ABS) of the recording head and the reproducing head is formed. As a result, the thin film magnetic head is completed.

In the embodiment, the top pole 49 is formed so that the position of the front edge face 22 thereof may match the TH0 position and may be located in front of the position of the step face 21A of the top pole chip 45A. Thus, similarly to the above-described second embodiment shown in FIG. 27, the side edge face 23 of the end portion 27A(1) always forms a sharp right angle with the edge face 22 of the connection portion 27C(2) of the top pole 49, even if the intersection 24A of the step face 21A of the top pole chip 45A and the side edge face 23 of the end portion 27A(1) is not sharply right-angled but is rounded. Thus, the width W3 of the end portion 27A(1) does not increase near the TH0 position. Accordingly, similarly to the above-described second embodiment, the width W1 exactly designed can be ensured over the overall throat height TH. Thus, the write track width on the recording medium can be precisely controlled. Therefore, the occurrence of the side-write phenomenon can be effectively prevented. In this description, the top pole 27C is replaced with the top pole 49, and the top pole chip 27A is replaced with the top pole chip 45A, referring to FIG. 27.

In the embodiment, the connection portion 27C(2) extending at a right angle is located immediately at the rear of the TH0 position of the end portion 27A(1) of the top pole chip 45A, and the intermediate portion 27A(2) is located immediately at the rear of the step face 21A. Thus, a sufficient magnetic volume is ensured by the connection portion 27C(2) and the intermediate portion 27A(2). Therefore, similarly to the above-described second embodiment, the magnetic flux generated in the yoke portion 27C(1) can be effectively prevented from being saturated before reaching to the end portion 27A(1) of the top pole chip 45A. Accordingly, sufficient overwrite properties can be ensured.

In the embodiment, the top pole chip 45A can be formed on the flat portion. Thus, the photoresist pattern can be formed with high accuracy by photolithography. Therefore, the width of the end portion 27A(1) of the top pole chip 45A can be reduced with an accuracy of 0.5 μm to 0.25 μm. The top pole 49 can be also formed on the flat portion subjected to CMP. Therefore, patterning can be performed with high accuracy for the same reason.

In the embodiment, the thick insulating film 42 made of alumina or the like is formed between the bottom pole 7 and the thin film coils 43, and the thick insulating layer 46 made of alumina or the like is formed between the write gap layer 9 and the thin film coils 47. Therefore, the dielectric withstand voltage between the thin film coils 43 and the bottom pole 7 and the dielectric withstand voltage between the thin film coils 43 and 47 can be increased, and the leakage of the magnetic flux from the thin film coils 43 and 47 can be reduced.

[Fourth Embodiment]

Figure 42A:
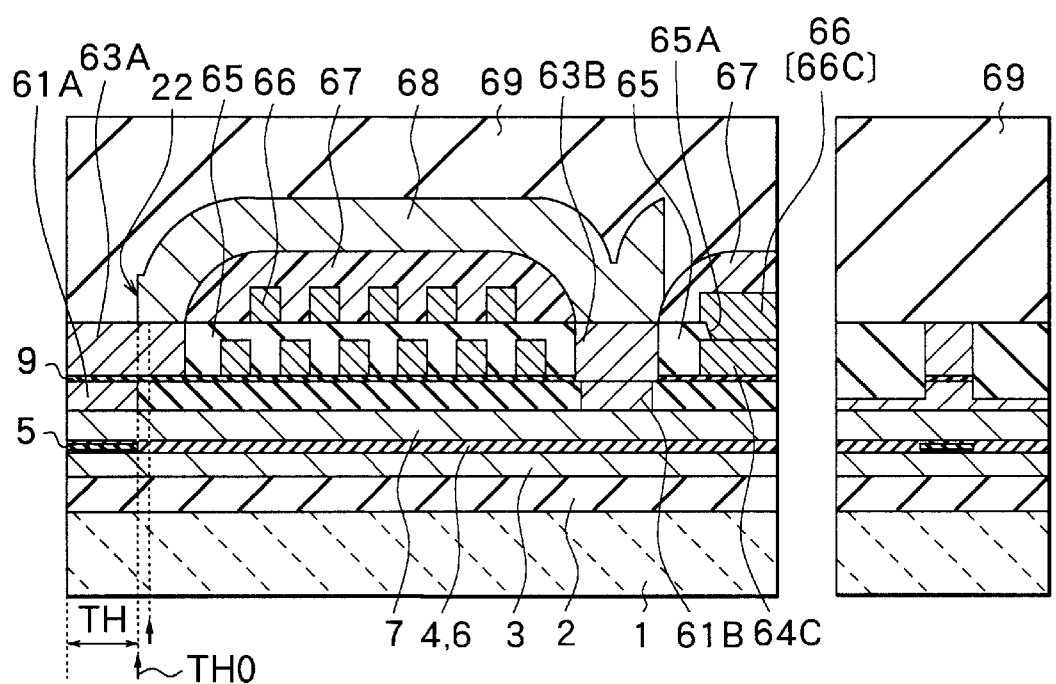
FIGS. 42A and 42B are cross sectional views for describing the step following the step of FIGS. 41A and 41B.
Figure 42B:
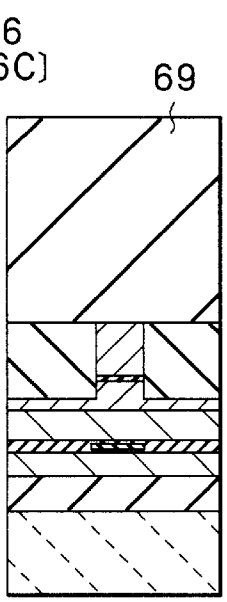
Figure 43:
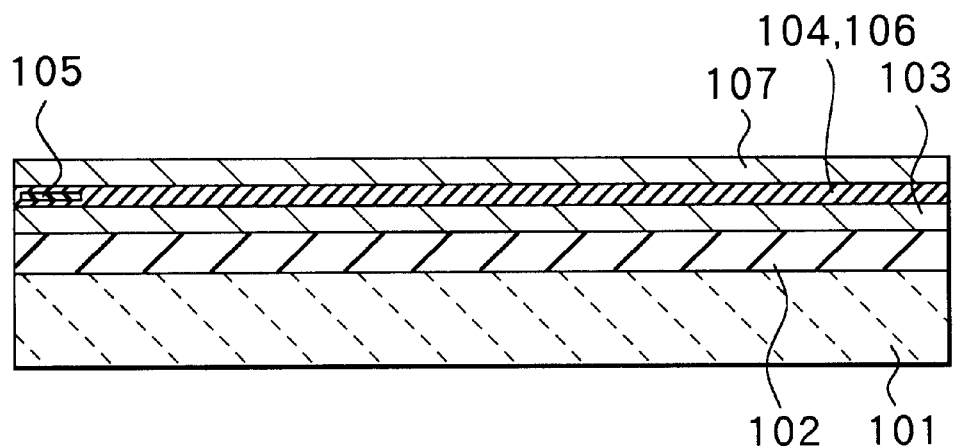
FIG. 43 is a cross sectional view for describing a step of a conventional method of manufacturing a thin film magnetic head.
Figure 44:
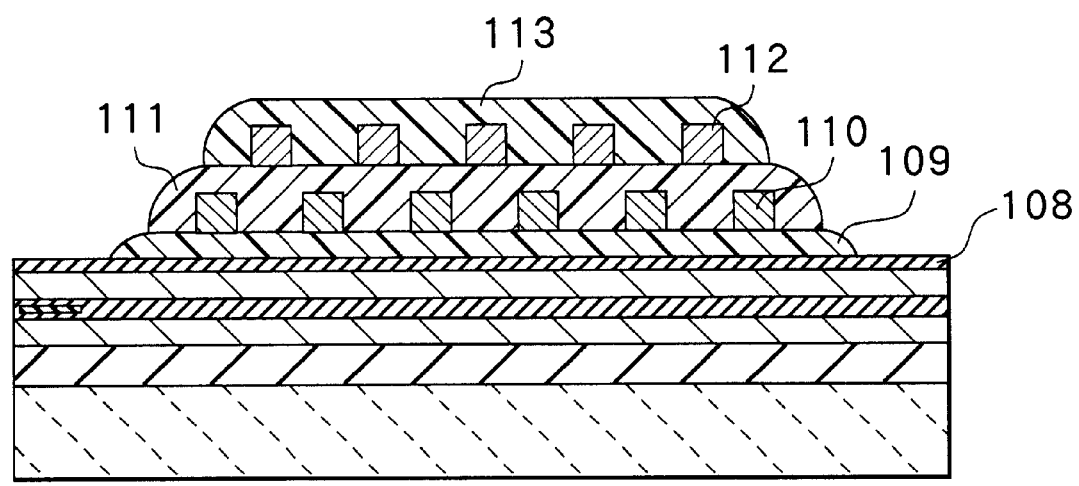
FIG. 44 is a cross sectional view for describing the step following the step of FIG. 43.
Figure 45:
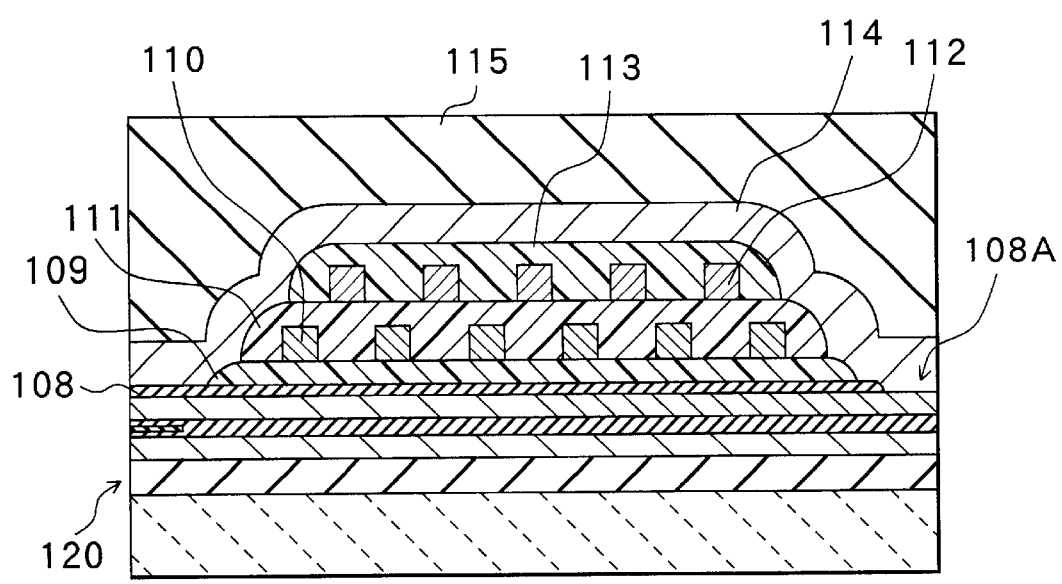
FIG. 45 is a cross sectional view for describing the step following the step of FIG. 44.
Figure 46:
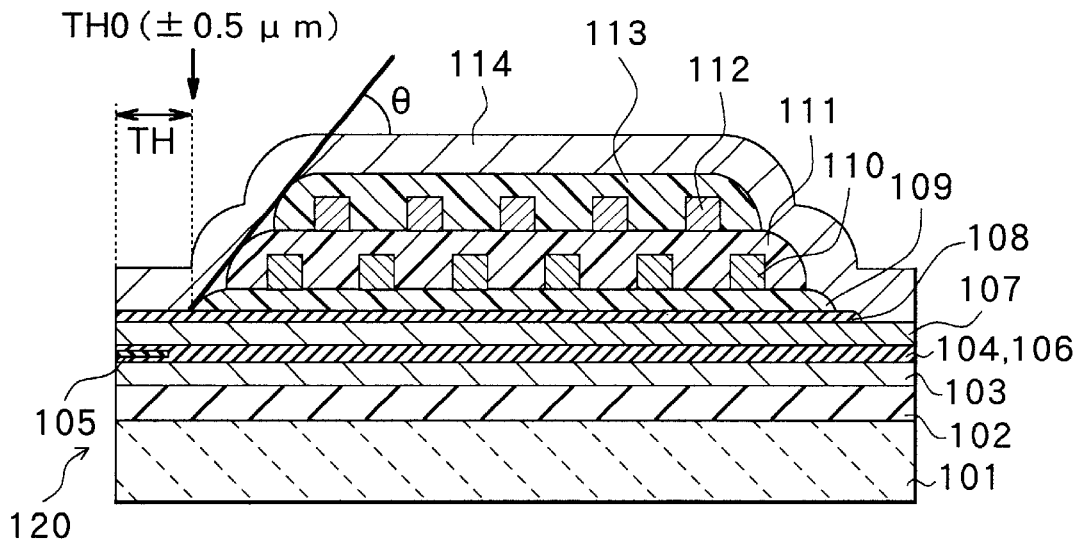
FIG. 46 is a cross sectional view of the structure of the conventional thin film magnetic head.
Figure 47:
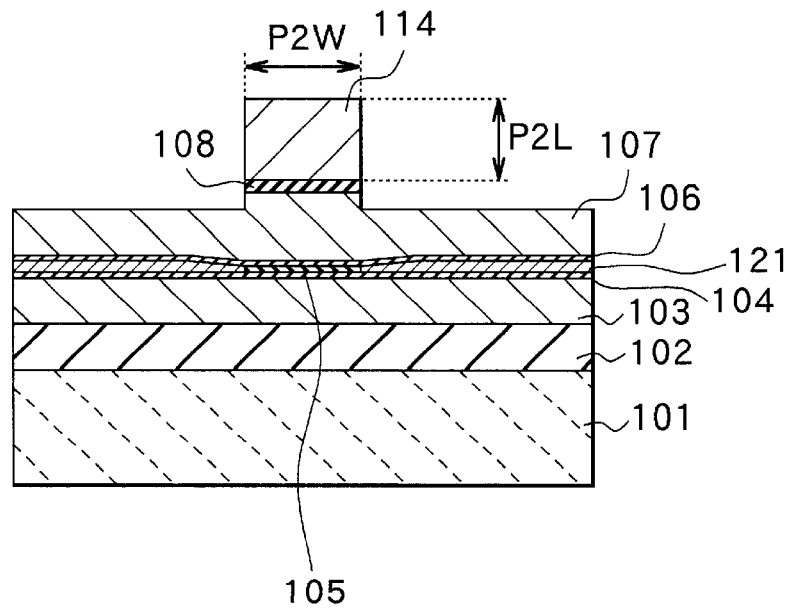
FIG. 47 is a cross sectional view of a cross section of the conventional thin film magnetic head parallel to an air bearing surface.
Figure 48:
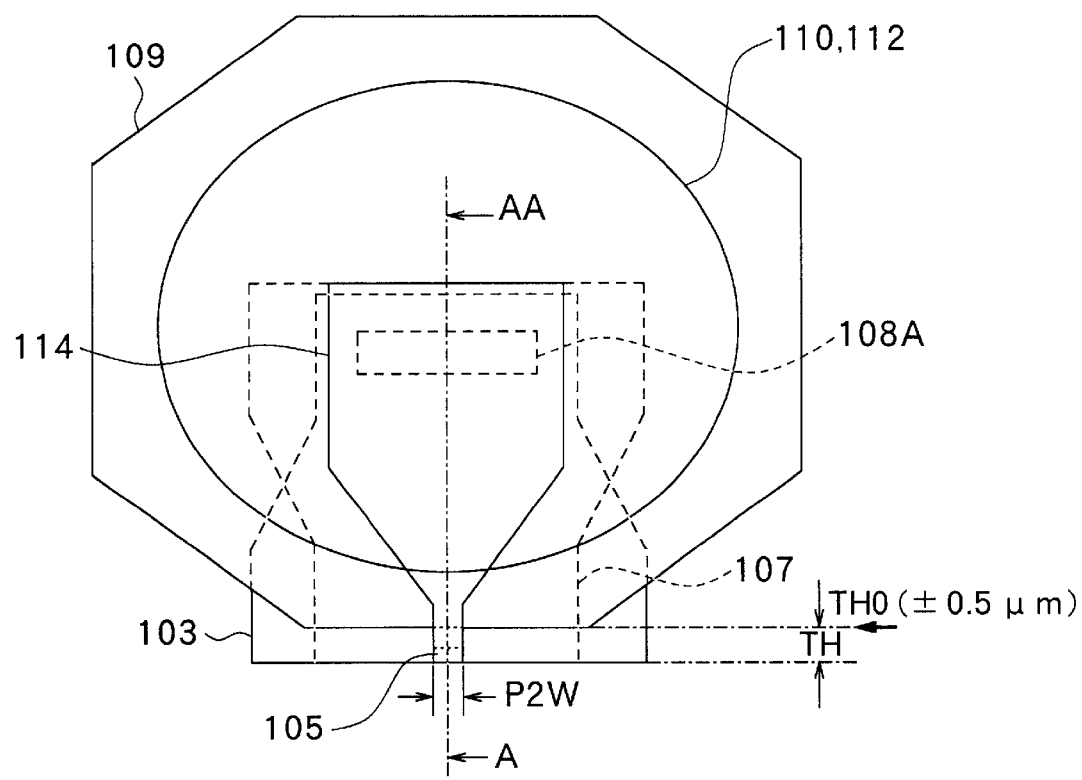
FIG. 48 is a plan view of the structure of the conventional thin film magnetic head.

Next, a method of manufacturing a composite thin film magnetic head will be described as a method of manufacturing a thin film magnetic head according to a fourth embodiment of the invention with reference to FIGS. 40A and 40B to FIGS. 42A and 42B. Since the thin film magnetic head according to the embodiment is embodied by the method of manufacturing a thin film magnetic head according to the embodiment, the thin film magnetic head will be described below in conjunction with the method of manufacturing a thin film magnetic head. FIGS. 40A, 41A and 42A show a cross section perpendicular to the air bearing surface. FIGS. 40B, 41B and 42B show a cross section of the magnetic pole parallel to the air bearing surface. In FIGS. 40A and 40B to FIGS. 42A and 42B, the same elements as the elements of the above-described embodiments are indicated by the same reference numerals.

In the method of manufacturing a thin film magnetic head according to the embodiment, the steps before the formation of the bottom pole 7 shown in FIGS. 40A and 40B are the same as the steps of the above-described first embodiment shown in FIGS. 1A and 1B to FIGS. 3A and 3B, and thus the description thereof is omitted.

In the embodiment, as shown in FIGS. 40A and 40B, the formation of the bottom pole 7 is finished, and then a bottom pole chip 61A and a bottom connection portion 61B are formed on the bottom pole 7. The bottom pole chip 61A is formed so that the end thereof on the side of the air bearing surface may be located near the position where the MR (GMR) height is equal to zero. Also, the bottom pole chip 61A is formed so that the side thereof opposite to the air bearing surface may be located at the position where the throat height is equal to zero.

Then, an insulating layer 62 of 3.0 μm to 4.0 μm thick made of an insulating material, e.g., alumina is formed over the overall surface by sputtering. Then, the surface is flattened by, for example, CMP, whereby the surfaces of the bottom pole chip 61A and the bottom connection portion 61B are exposed.

Then, as shown in FIGS. 41A and 41B, the write gap layer 9 of 0.2 μm to 0.3 μm thick made of an insulating material such as alumina is formed by sputtering. Then, the write gap layer 9 is patterned by photolithography, whereby the opening 9A for connecting the top pole to the bottom pole is formed.

Then, a top pole chip 63A and a top connection portion 63B for magnetically connecting the top pole to the bottom pole are formed on the write gap layer 9. At this time, the top connection portion 63B is formed so as to overlap and be in contact with the bottom connection portion 61B. On the other hand, the top pole chip 63A is formed so as to extend rearward from the air bearing surface and be longer than the bottom pole chip 61A. Similarly to the above-described third embodiment (see FIG. 26 and so on), the top pole chip 63A is formed so as to have the intermediate portion 27A(2) for ensuring the magnetic volume, the end portion 27A(1) for defining the track width and the step face 21A at the coupling portion between the intermediate portion 27A(2) and the end portion 27A(1). The top pole chip 63A has the plan shape shown in any one of FIG. 25 and FIGS. 31 to 34, for example. The top pole chip 63A is located so that the step face 21A thereof may be shifted slightly rearward from the position of the rear edge face of the bottom pole chip 61A (i.e., the TH0 position).

Then, the write gap layer 9 and the bottom pole chip 61A around the top pole chip 63A are etched in self-alignment by using the top pole chip 63A as the mask, whereby the trim structure is formed.

Then, first-layer thin film coils 64 made of, for example, copper (Cu) for the inductive recording head are formed with a thickness of 1.5 μm to 2.5 μm on the write gap layer 9 in the concave region between the top pole chip 63A and the top connection portion 63B by electroplating, for example. At the same time, a coil connection portion 64C for connecting the thin film coils 64 to second-layer thin film coils to be described later is formed in the rear region of the top connection portion 63B (the right region in FIG. 41A).

Then, as shown in FIGS. 42A and 42B, an insulating layer 65 of 3.0 μm to 4.0 μm thick made of an insulating material such as alumina is formed over the overall surface by sputtering. Then, the surface is flattened by, for example, CMP, whereby the surfaces of the top pole chip 63A and the top connection portion 63B are exposed.

Then, the insulating layer 65 is selectively etched, whereby an opening 65A extending to the coil connection portion 64C is formed.

Then, second-layer thin film coils 66 made of, for example, copper (Cu) for the inductive recording head are formed with a thickness of 1.5 μm to 2.5 μm on the insulating layer 65 by electroplating, for example. At the same time, a coil connection portion 66C to be brought into contact with the coil connection portion 64C through the opening 65A is formed.

Then, a photoresist layer 67 is formed by high-accuracy photolithography so as to coat the thin film coils 66 and the coil connection portion 64C. Then, heat treatment takes place at a temperature of, for example, 250° C. in order to flatten the surface of the photoresist layer 67 and provide insulation among the thin film coils 66.

Then, a top pole 68 is selectively formed with a thickness of about 3 μm to 4 μm by a method such as electroplating by using the same material as the material of the top pole chip 45A, for example. In this case, the top pole 68 is formed so that a part of the top pole 68 may overlap a part of the top pole chip 63A and so that the position of the front edge face 22 of the top pole 68 (i.e., the edge face on the side of the air bearing surface) may match the position of the rear edge of the bottom pole chip 61A (i.e., the TH0 position). The top pole 68 is formed so that the rear end of the top pole 68 may be located on the top connection portion 63B. Thus, the top pole 68 is magnetically coupled to the top pole chip 63A and magnetically coupled to the bottom pole 7 through the top connection portion 63B and the bottom connection portion 61B.

Finally, an overcoat layer 69 of about 30 μm thick made of alumina is formed by, for example, sputtering so as to coat the overall surface. Then, the slider is machined, whereby the air bearing surface (ABS) of the recording head and the reproducing head is formed. As a result, the thin film magnetic head is completed.

The embodiment achieves substantially the same functions and effects as the above-described third embodiment. That is, the write track width on the recording medium is precisely controlled, whereby the occurrence of the side-write phenomenon can be effectively prevented and sufficient overwrite properties can be ensured.

In the embodiment, the top pole chip 63A can be formed on the flat portion. Thus, the photoresist pattern can be formed with high accuracy by photolithography. Therefore, the width of the end portion 27A(1) of the top pole chip 63A can be reduced with an accuracy of 0.5 μm to 0.2 μm.

Although the invention has been described above by referring to some embodiments, the invention is not limited to these embodiments and various modifications of the invention are possible. For example, the method of manufacturing the composite thin film magnetic head has been described in the above-mentioned embodiments and modifications thereof. However, the invention can be applied to a record-only thin film magnetic head having an inductive magnetic transducer for writing or a thin film magnetic head having an inductive magnetic transducer for both of recording and reproducing. Moreover, the invention can be applied to a thin film magnetic head having the structure in which the element for writing and the element for reading are stacked in reverse order.

As described above, according to a thin film magnetic head or a method of manufacturing a thin film magnetic head of the invention, at least one of the two magnetic layers includes a first magnetic layer portion extending from a recording-medium-facing surface facing the recording medium to or to near an edge of the insulating layer on the side of the recording-medium-facing surface and having a constant width for defining a write track width; a second magnetic layer portion magnetically coupled to the first magnetic layer portion at a first coupling portion located at or near the edge of the insulating layer; and a third magnetic layer portion magnetically coupled to the second magnetic layer portion on the side of the second magnetic layer portion opposite to the first coupling portion. Also, a step along the width is formed at the first coupling portion so that the width of the first magnetic layer portion at the first coupling portion between the first magnetic layer portion and the second magnetic layer portion is smaller than the width of the second magnetic layer portion. Similarly, a step is formed at a second coupling portion so that the width of the second magnetic layer portion at the second coupling portion between the second magnetic layer portion and the third magnetic layer portion is smaller than the width of the third magnetic layer portion. Thus, the widths of the magnetic layers are determined in the following manner: the width of the first magnetic layer<the width of the second magnetic layer<the width of the third magnetic layer. Thus, an influence of an unnecessary reflected light from an underlying layer in photolithography for forming the first magnetic layer portion is reduced. Therefore, the width of the first magnetic layer portion can be formed with high accuracy. Moreover, it is possible to prevent the magnetic flux generated by the thin film coils from being saturated in the second and third magnetic layer portions before flowing into the first magnetic layer portion. Thus, a sufficient magnetic flux focused in stages through the second and third magnetic layer portions can be propagated to the first magnetic layer portion. Therefore, achieved is the effect of being able to ensure sufficient overwrite properties while reducing the width of the first magnetic layer portion to the submicron order, for example.

According to the thin film magnetic head or the method of manufacturing a thin film magnetic head of the invention, a step face of the second magnetic layer portion at the first coupling portion is substantially perpendicular to a direction in which the first magnetic layer portion extends. Thus, the function of reducing the influence of the unnecessary reflected light from the underlying layer in photolithography for forming the first magnetic layer portion can be sufficiently obtained. Therefore, the effect of being able to form the width of the first magnetic layer portion with higher accuracy is achieved.

According to the thin film magnetic head or the method of manufacturing a thin film magnetic head of the invention, the fourth magnetic layer portion extends so as to overlap a part of the first magnetic layer portion across the first coupling portion, and an edge face of the fourth magnetic layer portion at the overlapping portion on the side of the recording-medium-facing surface is perpendicular to the direction in which the first magnetic layer portion extends. Thus, even if the corners of the step along the width at the first coupling portion are round in shape, the width of the first magnetic layer portion for defining the write track width on the recording medium is not influenced but exactly fixed over the region between the perpendicular portion and the end portion. Therefore, the effect of being able to precisely control the write track width on the recording medium is achieved.

According to the thin film magnetic head or the method of manufacturing a thin film magnetic head of the invention, the position of the edge face of the fourth magnetic layer portion matches the position of the edge of the insulating layer on the side of the recording-medium-facing surface. Thus, the width of the first magnetic layer portion is exactly fixed over the whole region called the throat height. Therefore, the effect of being able to more precisely control the write track width on the recording medium is achieved.

According to the thin film magnetic head or the method of manufacturing a thin film magnetic head of the invention, even if exposure for photolithography for forming the first magnetic layer portion is adversely influenced due to the formation of the second and third magnetic layer portions on the inclined surface and thus the corners of the step along the width at the first coupling portion are relatively greatly rounded, a variation in the substantial width of the first magnetic layer portion is avoided. That is, achieved is the effect of being able to stabilize the width of the magnetic pole for recording formed on the inclined surface, which has been heretofore difficult.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:
   two magnetic layers magnetically coupled to each other having two magnetic poles which face each other with a gap layer in between and face a recording medium, a thin film coil provided between the two magnetic layers, and an insulating layer for insulating the thin film coil from the two magnetic layers,
   wherein at least one of the two magnetic layers includes:
   a first magnetic layer portion extending from a recording-medium-facing surface facing the recording medium to or near to an edge of the insulating layer on the side of the recording-medium-facing surface and having a constant width for defining a write track width on the recording medium;
   a second magnetic layer portion magnetically coupled to the first magnetic layer portion at a first coupling portion located at or near the edge of the insulating layer;
   a third magnetic layer portion magnetically coupled to the second magnetic layer portion at a second coupling portion on the side of the second magnetic portion opposite to the first coupling portion; and
   a fourth magnetic layer portion magnetically coupled to and overlapping at least a part of the first magnetic layer portion, the second magnetic layer portion or the third magnetic layer portion, the fourth magnetic layer portion having a larger width and area than the width and area of the third magnetic layer portion, wherein
   a step along the width is formed at the first coupling portion so that the width of the first magnetic layer portion at the first coupling portion is smaller than the width of the second magnetic layer portion at the first coupling portion,
   a step along the width is formed at a second coupling portion so that the width of the second magnetic layer portion at the second coupling portion is smaller than the width of the third magnetic layer portion at the second coupling portion, and
   the first magnetic layer portion, the second magnetic layer portion and the third magnetic layer portion are integrally formed by the same step, and the fourth magnetic layer portion is formed as a separate part by a different step from the step of forming the first magnetic layer portion, the second magnetic layer portion and the third magnetic layer portion.

2. A thin film magnetic head according to claim 1, wherein a position of an edge face of the fourth magnetic layer portion on the side of the recording-medium-facing surface matches a position of the first coupling portion, or is situated closer to the recording medium than the first coupling portion is and the edge face is perpendicular to the direction in which the first magnetic layer portion extends.

3. A thin film magnetic head according to claim 2, wherein the position of the edge face of the fourth magnetic layer portion matches the position of the edge of the insulating layer on the side of the recording-medium-facing surface.

4. A thin film magnetic head according to claim 1, wherein a step face of the second magnetic layer portion at the first coupling portion is substantially perpendicular to a direction in which the first magnetic layer portion extends.

5. A thin film magnetic head according to claim 1, wherein the edges of the step face of the second magnetic layer portion along the width are chamfered.

6. A thin film magnetic head according to claim 1, wherein the width of the second magnetic layer portion is substantially constant regardless of the position thereof.

7. A thin film magnetic head according to claim 1, wherein the width of the second magnetic layer portion varies according to the position thereof.

8. A thin film magnetic head according to claim 7, wherein the width of the second magnetic layer portion becomes larger as it is farther from the first coupling portion.

9. A thin film magnetic head according to claim 1, wherein a step face of the third magnetic layer portion at the second coupling portion is substantially perpendicular to a direction in which the second magnetic layer portion extends.

10. A thin film magnetic head according to claim 1, wherein the width of the third magnetic layer portion is substantially constant regardless of the position thereof.

11. A thin film magnetic head according to claim 1, wherein the width of the third magnetic layer portion varies according to the position thereof.

12. A thin film magnetic head according to claim 11, wherein the width of the third magnetic layer portion becomes larger as it is farther from the second coupling portion.

13. A thin film magnetic head according to claim 1, wherein at least a part of the second magnetic layer portion or the third magnetic layer portion is located on an inclined surface formed of the insulating layer.

* * * * *